United States Patent
Suzuki et al.

(10) Patent No.: US 9,020,249 B2
(45) Date of Patent: Apr. 28, 2015

(54) COLOR PROCESSING APPARATUS AND COLOR PROCESSING METHOD

(75) Inventors: Takahiro Suzuki, Tokyo (JP); Susumu Shimbaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/480,389

(22) Filed: May 24, 2012

(65) Prior Publication Data

US 2012/0321177 A1 Dec. 20, 2012

(30) Foreign Application Priority Data

Jun. 17, 2011 (JP) ................................. 2011-135695
May 16, 2012 (JP) ................................. 2012-112687

(51) Int. Cl.
| | |
|---|---|
| G06K 9/00 | (2006.01) |
| H04N 9/67 | (2006.01) |
| H04N 1/60 | (2006.01) |
| H04N 9/68 | (2006.01) |
| G01J 3/46 | (2006.01) |

(52) U.S. Cl.
CPC ............... *H04N 9/67* (2013.01); *H04N 1/6061* (2013.01); *H04N 9/68* (2013.01); *G01J 3/462* (2013.01)

(58) Field of Classification Search
CPC ......... H04N 1/6061; H04N 9/67; H04N 9/68; H04N 1/603; G01J 3/462
USPC ......... 382/162, 167, 166, 263, 264, 254, 168, 382/196; 358/1.9, 518, 520, 3.01
See application file for complete search history.

(56) References Cited

U.S. PATENT DOCUMENTS

| | | | | |
|---|---|---|---|---|
| 5,243,414 | A * | 9/1993 | Dalrymple et al. ........... | 358/500 |
| 5,608,824 | A * | 3/1997 | Shimizu et al. .............. | 382/276 |
| 5,664,072 | A * | 9/1997 | Ueda et al. .................... | 358/1.9 |
| 6,434,266 | B1 * | 8/2002 | Kanno et al. .................. | 382/162 |
| 6,552,495 | B1 * | 4/2003 | Chang ........................ | 315/169.3 |
| 6,628,822 | B1 * | 9/2003 | Nakabayashi et al. ........ | 382/162 |
| 6,724,507 | B1 * | 4/2004 | Ikegami et al. .............. | 358/518 |
| 7,426,061 | B2 | 9/2008 | Mimamino | |
| 7,558,422 | B2 * | 7/2009 | Koyama et al. .............. | 382/162 |
| 7,701,465 | B2 | 4/2010 | Suzuki et al. | |
| 7,965,427 | B2 | 6/2011 | Suzuki et al. | |
| 7,983,479 | B2 | 7/2011 | Suzuki et al. | |
| 7,990,575 | B2 | 8/2011 | Suzuki | |
| 8,018,485 | B2 | 9/2011 | Minai et al. | |

(Continued)

FOREIGN PATENT DOCUMENTS

| | | |
|---|---|---|
| CN | 1612586 A | 5/2005 |
| CN | 101364401 A | 2/2009 |

(Continued)

OTHER PUBLICATIONS

U.S. Appl. No. 13/453,823, filed Apr. 23, 2012, by Susumu Shimbaru.

(Continued)

*Primary Examiner* — Mekonen Bekele
(74) *Attorney, Agent, or Firm* — Fitzpatrick, Cella, Harper & Scinto

(57) ABSTRACT

Data which represents a color space is input, a dataset which represents visual uniformity in each of a plurality of color areas is acquired, and control points which indicate a control region including the plurality of color areas corresponding to the dataset are set on the color space. Then, using the control points and dataset, the color space is corrected to be shrunk.

14 Claims, 26 Drawing Sheets

(56) References Cited

U.S. PATENT DOCUMENTS

| | | | | |
|---|---|---|---|---|
| 8,842,339 B2* | 9/2014 | Shimbaru | ............ | 358/1.9 |
| 2002/0051155 A1* | 5/2002 | Fujioka et al. | ............ | 358/1.9 |
| 2002/0163669 A1* | 11/2002 | Yamazaki et al. | ............ | 358/3.23 |
| 2003/0001860 A1* | 1/2003 | Yamazaki et al. | ............ | 345/590 |
| 2004/0223641 A1* | 11/2004 | Koyama et al. | ............ | 382/162 |
| 2007/0024718 A1* | 2/2007 | Yu et al. | ............ | 348/222.1 |
| 2007/0229867 A1* | 10/2007 | Suzuki | ............ | 358/1.9 |
| 2007/0269126 A1* | 11/2007 | Choe et al. | ............ | 382/254 |
| 2009/0296117 A1 | 12/2009 | Wada et al. | | |
| 2010/0289835 A1* | 11/2010 | Holub | ............ | 345/690 |
| 2011/0069896 A1* | 3/2011 | Ishiga | ............ | 382/224 |
| 2012/0081441 A1* | 4/2012 | Miyake et al. | ............ | 347/15 |
| 2013/0141740 A1* | 6/2013 | Shimbaru | ............ | 358/1.9 |

FOREIGN PATENT DOCUMENTS

| | | | | |
|---|---|---|---|---|
| JP | 2002-150277 | | 5/2002 | |
| JP | 2003256821 A | * | 9/2003 | ............ G06T 1/00 |
| JP | 2010118923 A | | 5/2010 | |
| WO | 2010044483 A1 | | 4/2010 | |

OTHER PUBLICATIONS

MacAdam, D.L. ,"Visual Sensitivities to Color Differences in Daylight", Journal of the Optical Society of America, vol. 32, No. 5, pp. 247-274, May 1942.

Melgosa, M., et al, "Suprathreshold Color-Difference Ellipsoids for Surface Colors", Color Research and Application, vol. 22, No. 3, pp. 148-155, Jun. 1997.

Luo, M.R., et al., "Chromaticity-Discrimination Ellipses for Surface Colours", Color Research and Application, vol. 11, No. 1, pp. 25-42, 1986.

Brown, W.R.J., "Color Discrimination of Twelve Observers", February, Journal of the Optical Society of America, vol. 47, No. 2, pp. 137-143, 1957.

Ebner, F., et al., "Finding Constant Hue Surfaces in Color Space", SPIE vol. 3300, 1998.

Chinese Office Action dated May 26, 2014 for counterpart Chinese Appln No. 201210206064.8.

* cited by examiner

F I G. 1
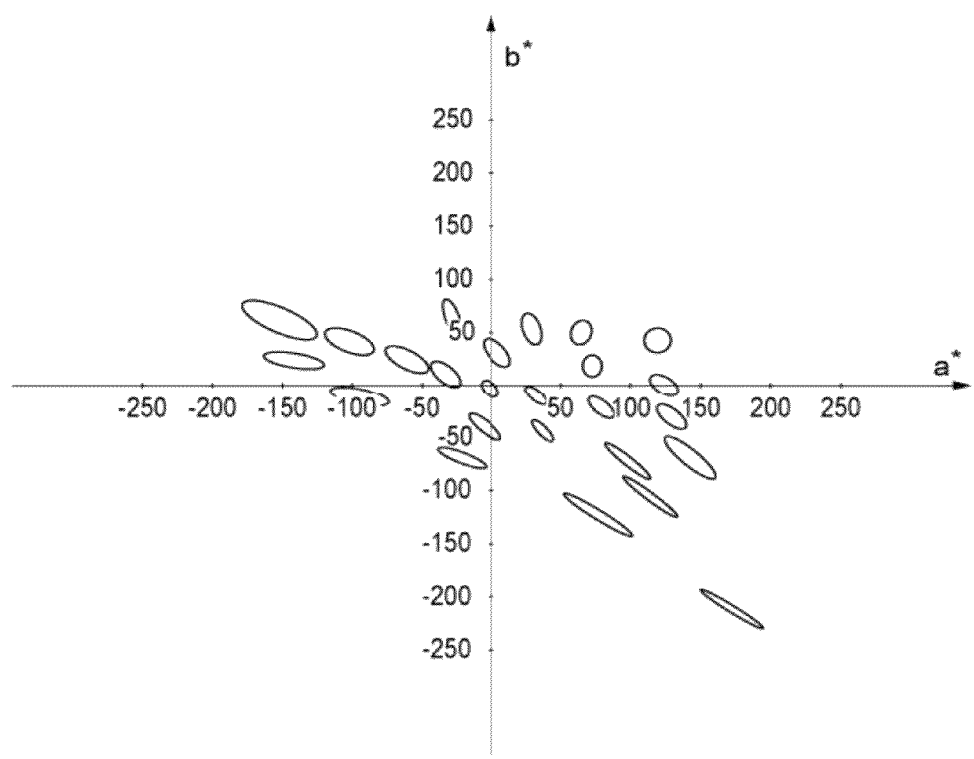

- ● : COLOR DISCRIMINATION THRESHOLD CORRESPONDING TO CERTAIN COLOR
- —— : ELLIPSE THAT APPROXIMATES COLOR DISCRIMINATION THRESHOLDS
- ------ : MAJOR AXIS OF ELLIPSE
- —·—·— : MINOR AXIS OF ELLIPSE

FIG. 8

| ELLIPSE APPROXIMATION DATA | | COORDINATES (CIE TRISTIMULUS VALUES XYZ) |
|---|---|---|
| ELLIPSE 1 | CENTER<br>MAJOR AXIS END POINT 1<br>MAJOR AXIS END POINT 2<br>MINOR AXIS END POINT 1<br>MINOR AXIS END POINT 2 | (XXX, XXX, XXX)<br>(XXX, XXX, XXX)<br>(XXX, XXX, XXX)<br>(XXX, XXX, XXX)<br>(XXX, XXX, XXX) |
| ELLIPSE 2 | CENTER<br>MAJOR AXIS END POINT 1<br>MAJOR AXIS END POINT 2<br>MINOR AXIS END POINT 1<br>MINOR AXIS END POINT 2 | (XXX, XXX, XXX)<br>(XXX, XXX, XXX)<br>(XXX, XXX, XXX)<br>(XXX, XXX, XXX)<br>(XXX, XXX, XXX) |
| ⋮ | | (XXX, XXX, XXX) |

FIG. 9

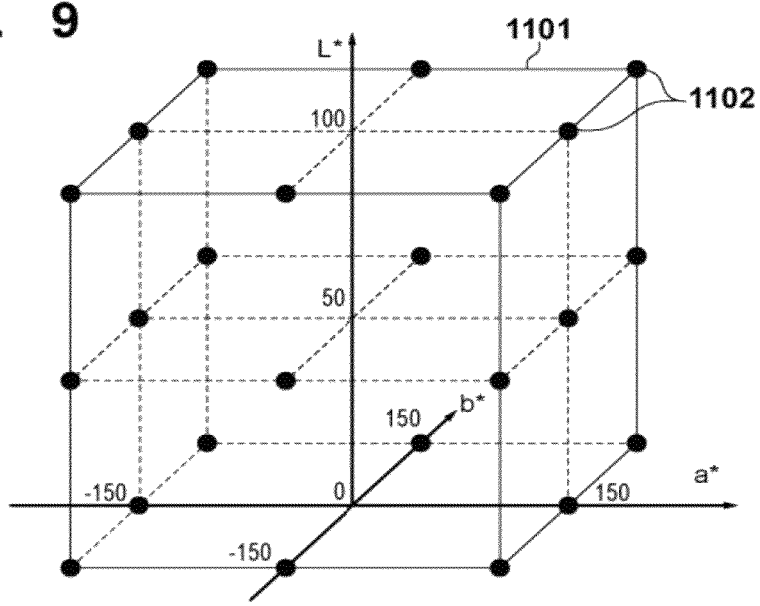

F I G. 10

| REFERENCE COLOR SPACE | | | UNIFORM COLOR APPEARANCE SPACE | | |
|---|---|---|---|---|---|
| $L^*$ | $a^*$ | $b^*$ | $L^{*1}$ | $a^{*1}$ | $b^{*1}$ |
| 0 | -150 | -150 | XXX | XXX | XXX |
| 0 | -150 | -140.63 | XXX | XXX | XXX |
| 0 | -150 | -131.25 | XXX | XXX | XXX |
| ⋮ | ⋮ | ⋮ | ⋮ | ⋮ | ⋮ |
| 31.25 | 0 | 0 | XXX | XXX | XXX |
| 31.25 | 0 | 9.38 | XXX | XXX | XXX |
| ⋮ | ⋮ | ⋮ | ⋮ | ⋮ | ⋮ |
| 75 | 37.5 | 93.75 | XXX | XXX | XXX |
| 75 | 37.5 | 103.13 | XXX | XXX | XXX |
| ⋮ | ⋮ | ⋮ | ⋮ | ⋮ | ⋮ |
| 100 | 150 | 140.63 | XXX | XXX | XXX |
| 100 | 150 | 150 | XXX | XXX | XXX |

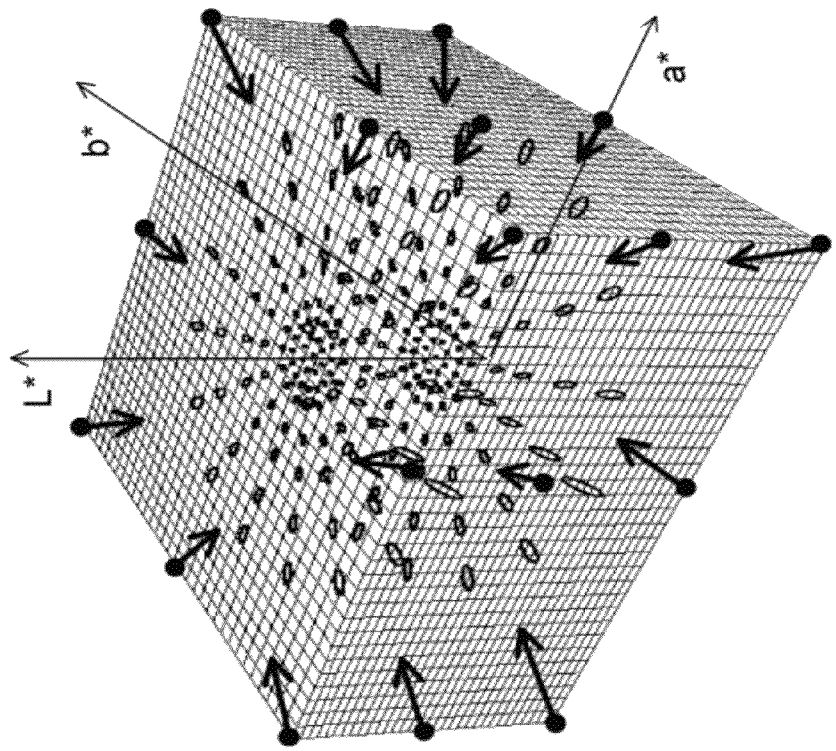
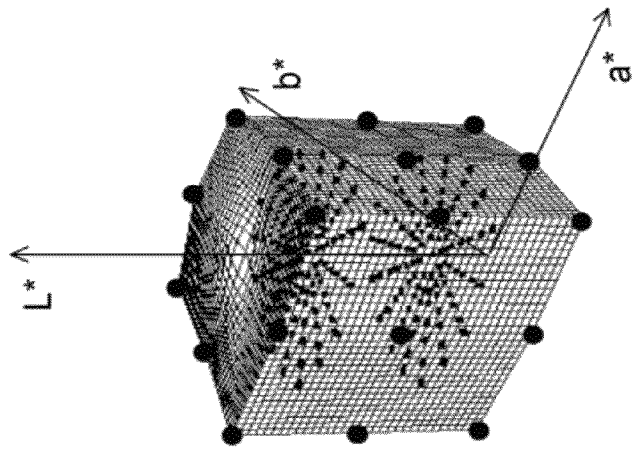
FIG. 11A
FIG. 11B

F I G. 13
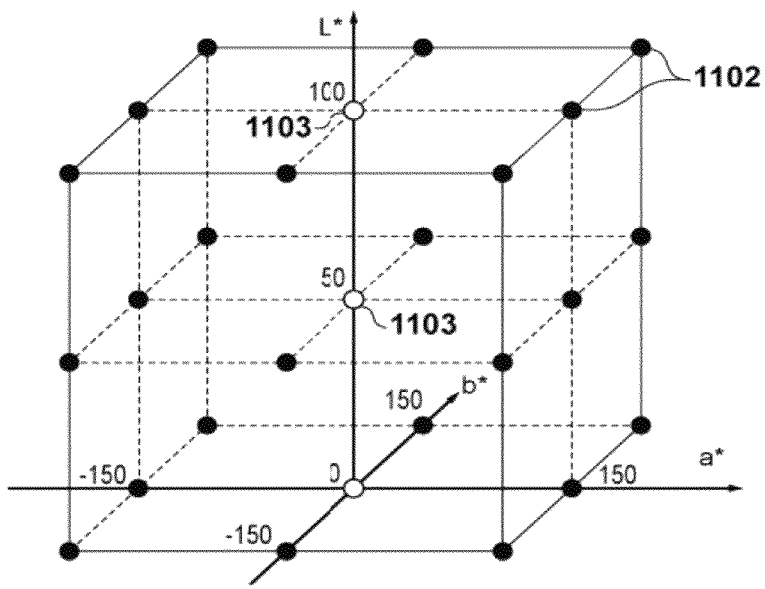
F I G. 14
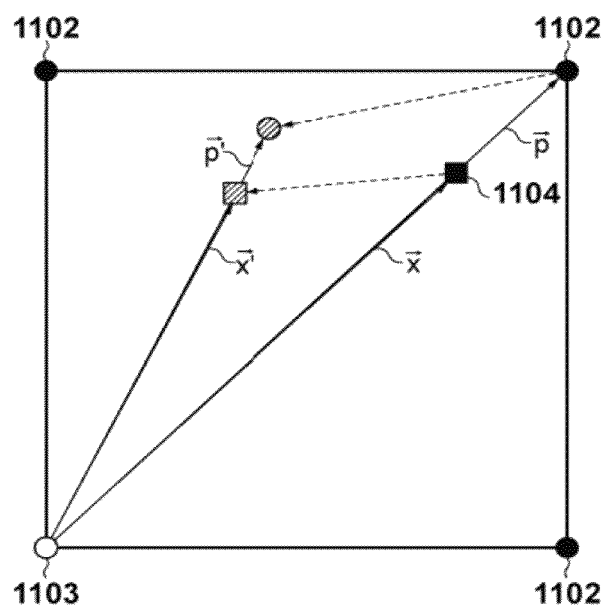

F I G. 15
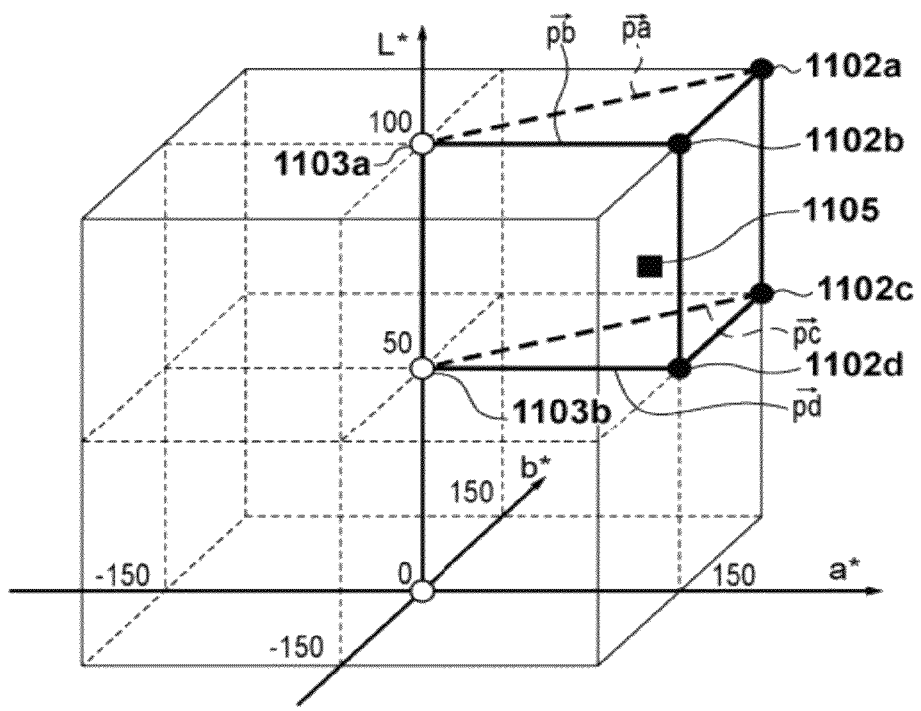

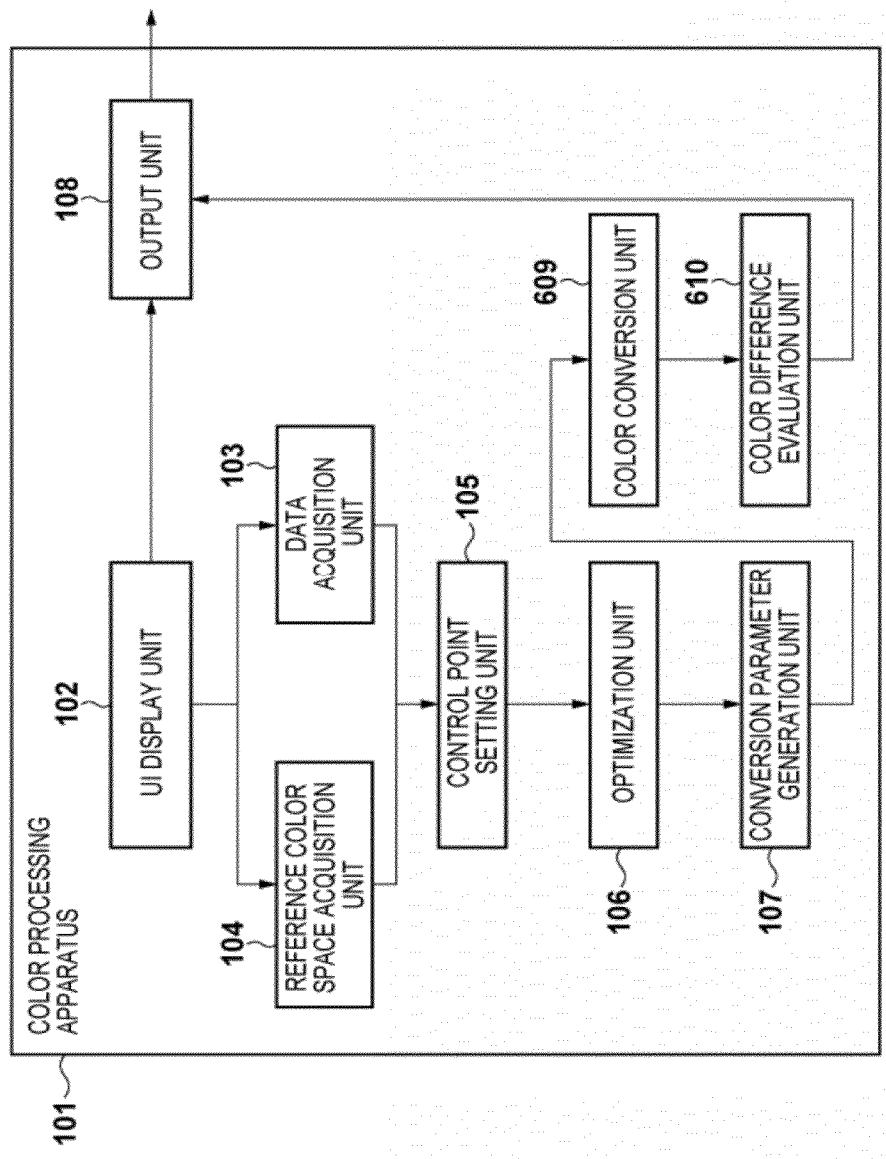

COLOR PROCESSING APPARATUS AND COLOR PROCESSING METHOD

BACKGROUND OF THE INVENTION

1. Field of the Invention

The present invention relates to a color processing apparatus and color processing method and, more particularly, to a color processing apparatus and color processing method, which generate a color space which matches human appearance.

2. Description of the Related Art

As a color system required to quantitatively express colors, various color spaces are available. For example, a CIELAB space and CIELUV space specified by CIE (International Commission on Illumination), a JCh space in CIECAM02, and the like are typical examples. However, these color spaces are non-uniform color spaces for human appearance.

FIG. 1 shows a state in which MacAdam's color discrimination thresholds (D. L. MacAdam "Visual sensitivities to color differences in daylight" Journal of the Optical Society of America, Vol. 32, No. 5, pp. 247-274, May 1942) respectively for 25 colors are plotted on a CIELAB space. Note that in FIG. 1, MacAdam's color discrimination thresholds (to be referred to as MacAdam ellipses hereinafter) are enlarged to 10×, and only pieces of chromaticity information are plotted on an a*b* plane for the sake of simplicity.

Each elliptic graphic shown in FIG. 1 indicates a range in which one recognizes the same color. For low-saturation colors, areas of the graphics are relatively small. For high-saturation colors (especially for blue and green), areas of the graphics are very large. That is, one can discriminate low-saturation colors even when distances in the color space are small, but cannot discriminate high-saturation blue and green colors even when distances in the color space are large. The CIELAB space does to match human appearance.

Japanese Patent Laid-Open No. 2002-150277 (literature 1) describes a method of generating a color space which matches human appearance. The method of literature 1 divides a color space which is not uniform for human appearance such as a CIELUV space (to be referred to as a non-uniform color appearance space hereinafter) into small regions such as tetrahedrons (triangles in case of a two-dimensional space). Then, vertex positions of respective tetrahedrons are optimized so that uniform color difference ellipse data such as MacAdam color discrimination thresholds are expressed as perfect circles, thereby correcting the CIELUV space to a color space which is uniform to human appearance (to be referred to as a uniform color appearance space hereinafter).

However, the method of patent literature 1 suffers a problem of locally abrupt color changes which may readily occur, since it decides moving positions of vertices of tetrahedrons obtained by dividing the non-uniform color appearance space by optimization. Literature 1 describes a method of keeping continuity and a method of preventing inversions among neighboring tetrahedrons in optimization of moving positions of vertices of tetrahedrons. However, since optimization is done for each tetrahedron, abrupt changes readily occur in color areas without any uniform color difference ellipse data or color areas in which a plurality of uniform color difference ellipse data are very closer to each other. Furthermore, generation of a uniform color appearance space by the invention of literature 1 requires a very long processing time.

SUMMARY OF THE INVENTION

In one aspect, a color processing apparatus comprising: an input unit configured to input data which represents a color space; an acquisition unit configured to acquire a dataset which represents visual uniformity in each of a plurality of color areas; a setting unit configured to set, on the color space, control points which indicate a control region including the plurality of color areas corresponding to the dataset; and a correction unit configured to correct to shrink the color space using the control points and the dataset.

In another aspect, a color processing apparatus comprising: an input unit configured to input data which represents a color space; an acquisition unit configured to acquire a dataset which represents visual uniformity in each of a plurality of color areas; a setting unit configured to set, on the color space, control points which indicate a control region; and a generation unit configured to generate conversion parameters required to convert an arbitrary point on the color space into a point on a uniform color appearance space using the control points, the dataset, and a center of the color space.

In another aspect, a color processing method comprising the steps of: inputting data which represents a color space; acquiring a dataset which represents visual uniformity in each of a plurality of color areas; setting, on the color space, control points which indicate a control region including the plurality of color areas corresponding to the dataset; and correcting to shrink the color space using the control points and the dataset.

In another aspect, a color processing method comprising the steps of: inputting data which represents a color space; acquiring a dataset which represents visual uniformity in each of a plurality of color areas; setting, on the color space, control points which indicate a control region; and generating conversion parameters required to convert an arbitrary point on the color space into a point on a uniform color appearance space using the control points, the dataset, and a center of the color space.

According to these aspects, a smooth uniform color appearance space which is free from any locally abrupt changes can be generated within a short period of time.

Further features of the present invention will become apparent from the following description of exemplary embodiments with reference to the attached drawings.

BRIEF DESCRIPTION OF THE DRAWINGS

FIG. 1 is a graph showing MacAdam's color discrimination thresholds for 25 colors, which are plotted on a CIELAB space.

FIG. 8 is a table for explaining a format example of a color discrimination threshold dataset.

FIG. 9 is a graph showing a setting example of a control region and control points.

FIG. 10 is a table for explaining a description example of an LUT generated by a conversion parameter generation unit.

FIGS. 11A and 11B are conceptual graphs for explaining a state in which ellipse approximation data are got closer to a perfect circle by optimization of control parameters.

FIG. 13 is a graph for explaining the relationship between control points and a center.

FIG. 14 is a view for explaining movement of an intermediate point.

FIG. 15 is a graph for explaining mapping of a color discrimination threshold dataset.

FIG. 27 is a block diagram for explaining the logical arrangement of a color processing apparatus according to the fifth embodiment.

DESCRIPTION OF THE EMBODIMENTS

A color processing apparatus and color processing method according to embodiments of the present invention will be described in detail hereinafter with reference to the drawings.

First Embodiment

[Apparatus Arrangement]

Figure 2:
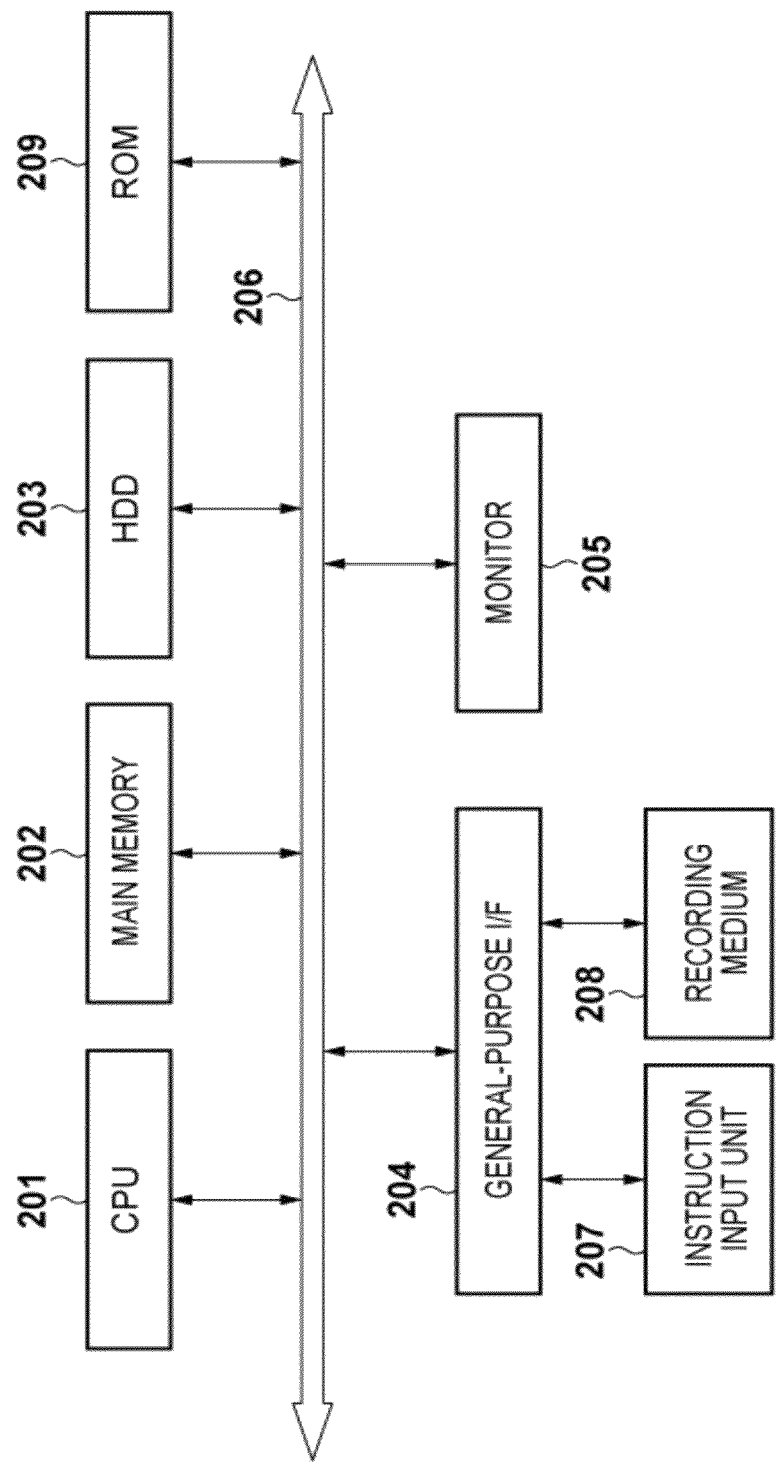
FIG. 2 is a block diagram showing the arrangement of a color processing apparatus according to an embodiment.

The arrangement of a color processing apparatus according to the first embodiment will be described below with reference to the block diagram shown in FIG. 2. A CPU (microprocessor) 201 executes programs stored in a ROM (Read Only Memory) 209 and HDD (Hard Disk Drive) 203 using a main memory 202 such as a RAM (Read Only Memory) as a work memory, thereby controlling units to be described below via a system bus 206. Note that the ROM 209 and HDD 203 store programs and various data required to implement color processing to be described later.

To a general-purpose I/F (Interface) 204 such as USB (Universal Serial Bus) or IEEE1394, an instruction input unit 207 such as a keyboard and mouse, and a recording medium 208 such as a USB memory or memory card are connected. Also, a monitor 205 displays a UI (User Interface) and information indicating intermediate processing results and processing results under the control of the CPU 201.

For example, the CPU 201 loads an application program (AP) stored in the ROM 209, HDD 203, or recording medium 208 onto a predetermined area of the main memory 202 in accordance with a user instruction input via the instruction input unit 207. Then, the CPU 201 executes the AP and displays a UI on the monitor 205 according to the AP.

Next, the CPU 201 loads various data stored in the HDD 203 or recording medium 208 onto a predetermined area of the main memory 202 according to a UI operation by the user. Then, the CPU 201 applies predetermined calculation processing to various data loaded onto the main memory 202 according to the AP. The CPU 201 displays the calculation processing result on the monitor 205 and stores it in the HDD 203 or recording medium 208 according to a UI operation by the user.

Note that the CPU 201 can also exchange programs, data, and calculation processing results with a server apparatus on a network via a network I/F (not shown) connected to the system bus 206.

[Logical Arrangement]

Figure 3:
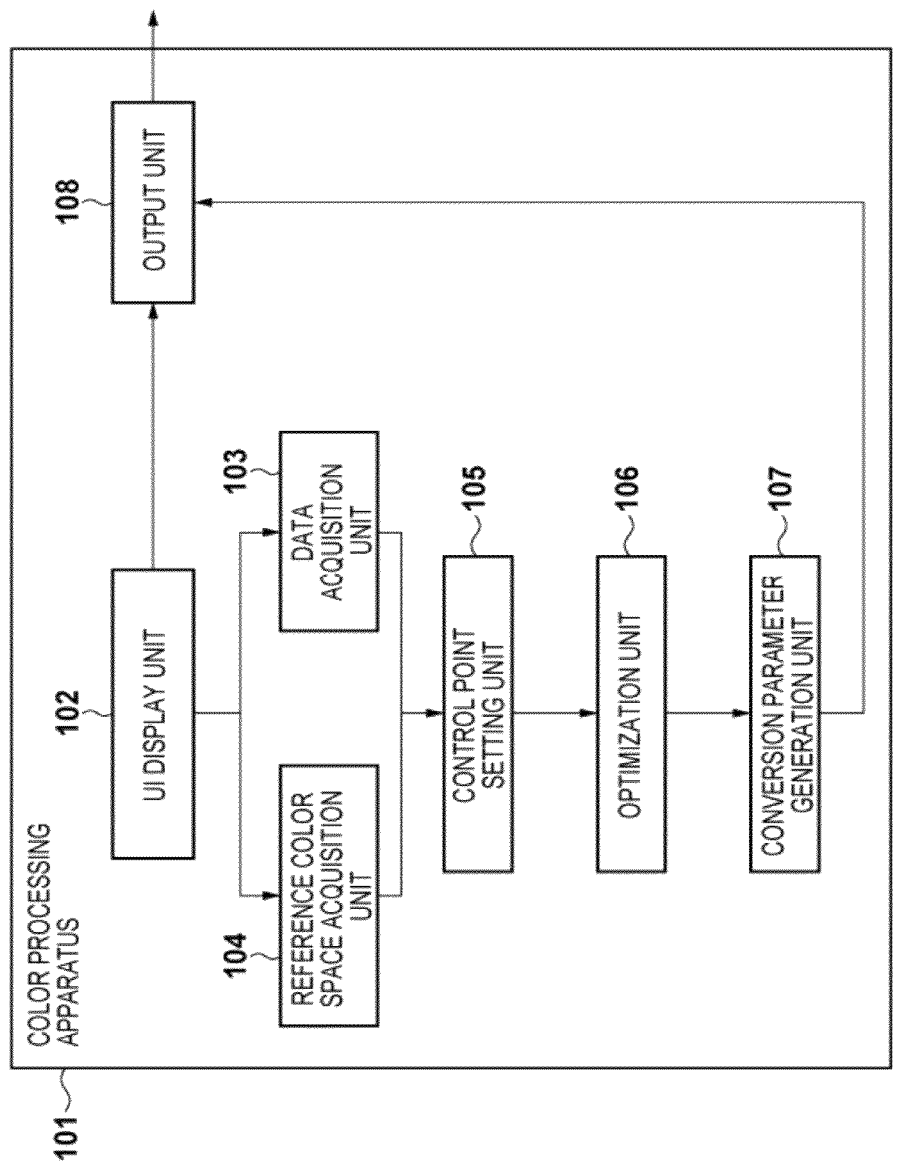
FIG. 3 is a block diagram showing the logical arrangement of the color processing apparatus according to the embodiment.

The logical arrangement of a color processing apparatus 101 according to the first embodiment will be described below with reference to the block diagram shown in FIG. 3. Note that the arrangement shown in FIG. 3 is implemented when the CPU 201 executes the AP.

In the color processing apparatus 101, a UI display unit 102 displays a UI on the monitor 205. A data acquisition unit 103 acquires a color discrimination threshold dataset such as MacAdam ellipses as data of human color discriminable ranges from the HDD 203, recording medium 208, or the like. A reference color space acquisition unit 104 acquires data which expresses a non-uniform color appearance space, which is used as a generation source of a uniform color appearance space, as data of a reference color space from the HDD 203, recording medium 208, or the like.

A control point setting unit 105 sets a region corresponding to a control range (to be referred to as a control region hereinafter) on the reference color space acquired by the reference color space acquisition unit 104, and sets control points at boundaries of the control region. An optimization unit 106 optimizes control parameters including moving directions and amounts and compression ratios to the center of control points using an optimization method, so that a graphic which represents color discrimination threshold data is got closer to a perfect circle.

A conversion parameter generation unit 107 generates conversion parameters required to convert arbitrary colors in the control region into those on a uniform color appearance space based on the control parameters optimized by the optimization unit 106. An output unit 108 outputs the conversion parameters generated by the conversion parameter generation unit 107 to the HDD 203, recording medium 208, or the like as a data file.

Figure 4:
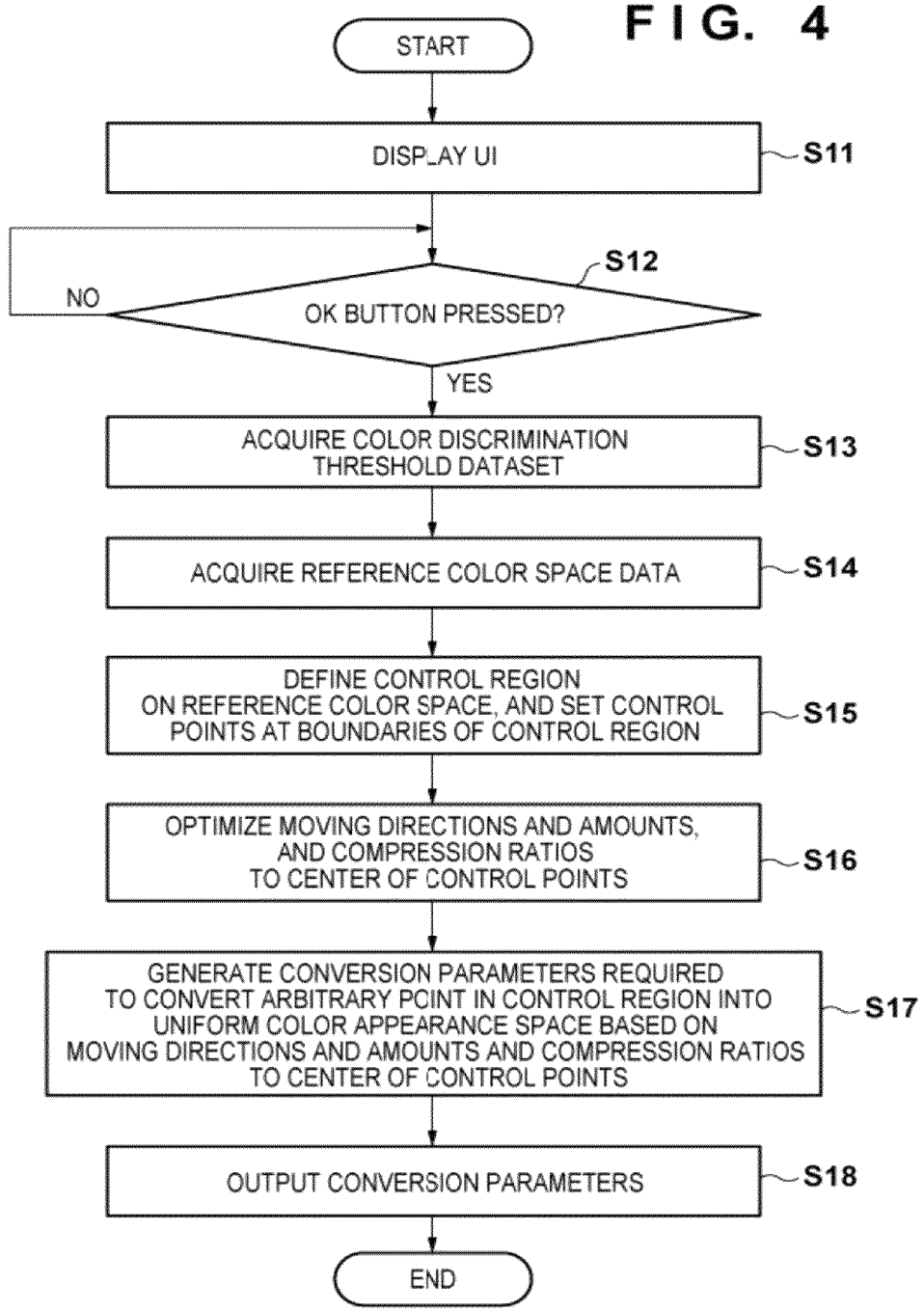
FIG. 4 is a flowchart for explaining processing executed by the color processing apparatus.

Processing executed by the color processing apparatus 101 will be described below with reference to the flowchart shown in FIG. 4.

Figure 5:
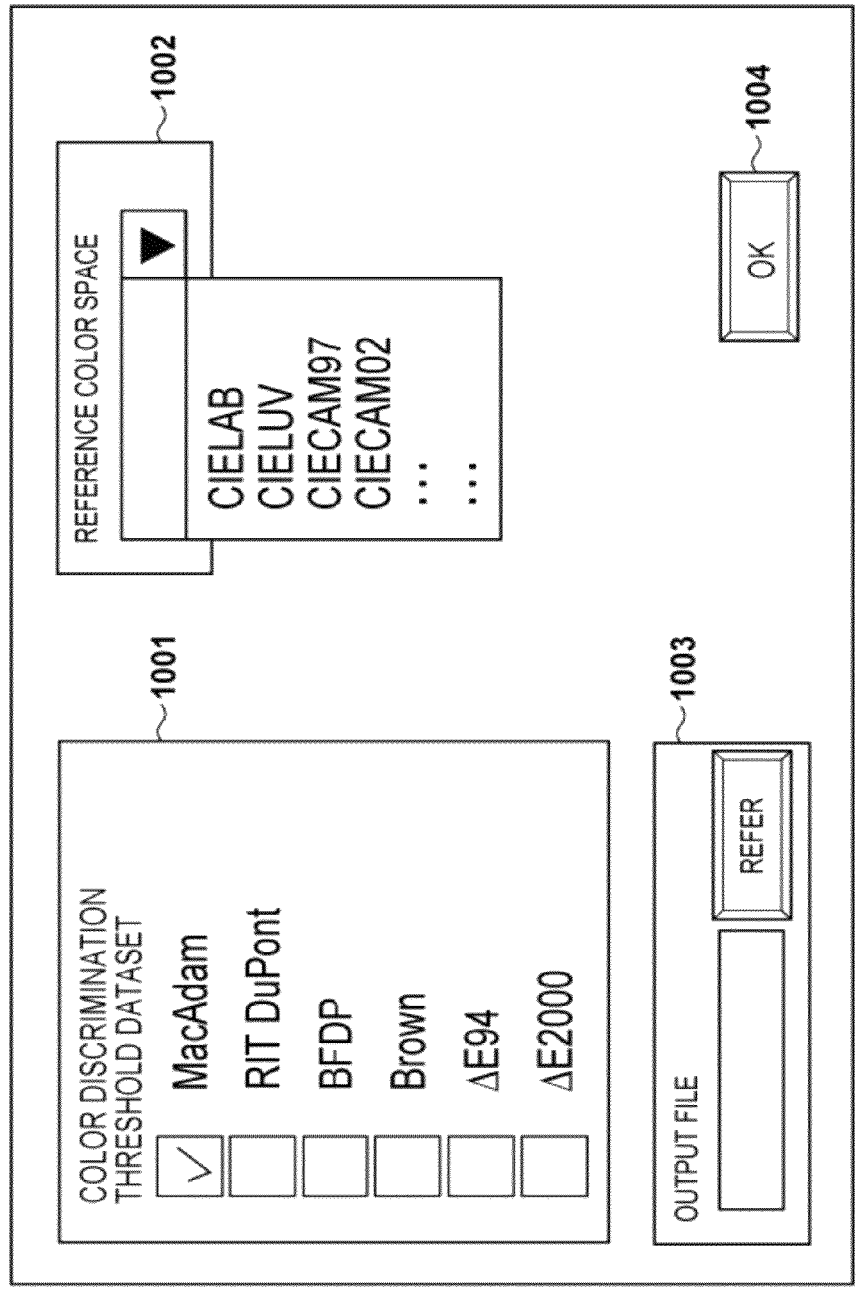
FIG. 5 is a view showing an example of a UI.

The UI display unit 102 displays a UI which allows the user to input information required for subsequent processes on the monitor 205 (step S11). FIG. 5 shows an example of the UI. The user selects a color discrimination threshold dataset to be used from a plurality of datasets stored in advance in the HDD 203, recording medium 208, or the like by operating an input area 1001. Note that only one color discrimination threshold dataset may be stored in advance.

In addition to the MacAdam ellipse dataset, various color discrimination threshold data have been proposed (see below), and these color discrimination threshold data may be used.

Melgosa M, Hita E, Poza A J, Alman D H, Berns R S "Suprathreshold color-difference ellipsoids for surface colors" Color Research and Application 22, pp. 148-155, 1997

BFDP dataset (M. R. Luo and B. Rigg "Chromaticity-Discrimination Ellipses for Surface Colours" Color Research and Application 11, pp. 25-42, 1986)

Brown dataset (W. R. J. Brown "Color Discrimination of Twelve Observers" Journal of the Optical Society of America 47, pp. 137-143, 1957)

Figure 6:
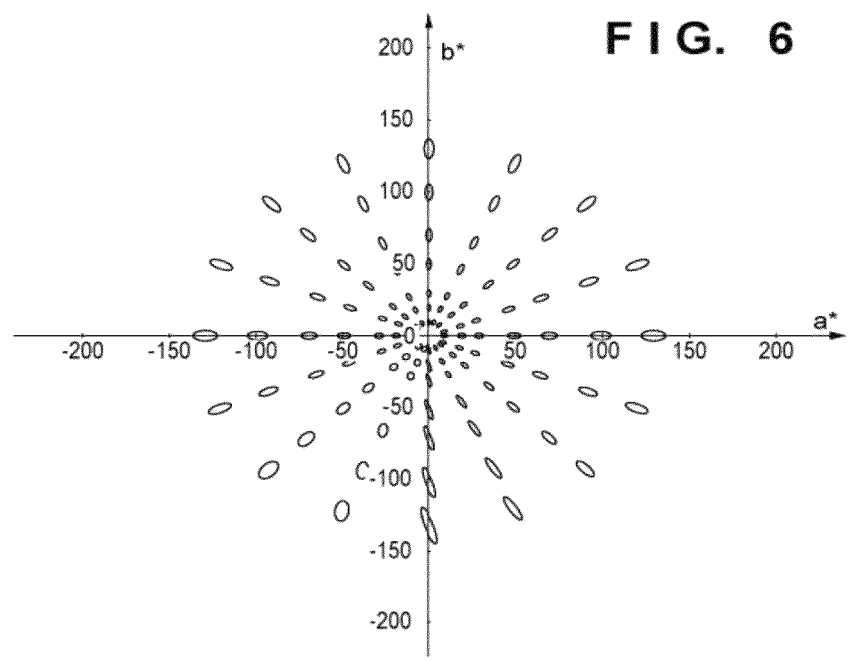
FIG. 6 is a graph showing an example of a color discrimination threshold dataset generated based on $\Delta E$.

By calculating back from color difference formulas $\Delta E94$, $\Delta E2000$, and the like specified by the CIE, a color discrimination threshold dataset may be generated and used. For example, a color discrimination threshold dataset may be generated by searching for points where $\Delta E94$ or $\Delta E2000$ values assume "1" to have an arbitrary point as the center in a circumferential pattern. FIG. 6 shows an example of a color discrimination threshold dataset on a CIELAB color space of a D65 light source, which is generated based on $\Delta E2000$. The user can select one or a plurality of color discrimination threshold datasets by operating the input area 1001.

The user selects a reference color space to be used by operating an input area 1002. For example, the input area 1002 has a form of a drop combo box, and the user can select, for example, a CIELAB space, CIELUV space, JCh space of CIECAM02, or the like from a drop-down menu.

The user inputs a file name used upon saving conversion parameters, which are generated by the color processing apparatus 101 and are required to convert a non-uniform color appearance space into a uniform color appearance space, by operating an input area 1003.

Upon completion of selections of the color discrimination threshold dataset to be used and the reference color space to be used, and input of the file name, the user presses an OK button 1004 (step S12) to instruct to start processing. Upon pressing of the OK button 1004, the data acquisition unit 103 acquires the color discrimination threshold dataset selected by the user from the HDD 203, recording medium 208, or the like (step S13). Note that the subsequent processes will be explained under the assumption that the color discrimination threshold dataset on the CIELAB space of the D65 light source, which is generated based on $\Delta E2000$, is selected.

Figure 7:
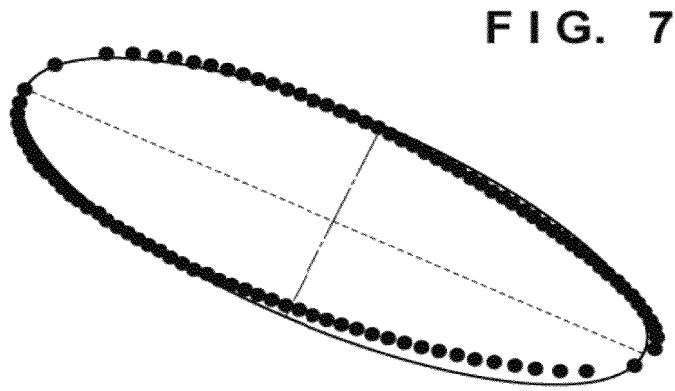
FIG. 7 is a graph for explaining an example of ellipse approximation of color discrimination threshold data.

In this embodiment, the HDD 203, recording medium 208, or the like stores an elliptic-approximated color discrimination threshold dataset in advance. An example of ellipse approximation of color discrimination threshold data will be described below with reference to FIG. 7. Also, a format example of the color discrimination threshold dataset will be described below with reference to FIG. 8. As shown in FIGS. 7 and 8, for example, data of a total of five points, that is, center coordinates of an ellipse, and coordinates of four points where major and minor axes and the ellipse intersect (to be referred to as end points hereinafter) on a CIEXYZ space form a set (to be referred to as ellipse approximation data hereinafter). A dataset in which ellipse approximation data are prepared respectively for a plurality of color areas is a color discrimination threshold dataset.

Next, the reference color space acquisition unit 104 acquires data of the reference color space selected by the user from the HDD 203, recording medium 208, or the like (step S14). Note that the subsequent processes will be described under the assumption that a CIELAB space is selected.

The control point setting unit 105 defines a control region on the CIELAB space as the reference color space, and sets control points at boundaries of the control region (step S15). A setting example of the control region and control points will be described below with reference to FIG. 9. A control region 1101 is a conversion target region into a uniform color appearance space, and data outside the control region 1101 cannot be converted into those on the uniform color appearance space. Therefore, the control region 1101 is preferably as broad as possible, and for example, $0 \leq L^* \leq 100$, $-150 \leq a^* \leq 150$, and $-150 \leq b^* \leq 150$ are defined as a control region. A plurality of control points are set at boundaries of the control region. For example, as shown in FIG. 9, a total of 24 points, that is, eight points respectively for lightness levels of $L^* = 0$, 50, and 100, are set. The ab coordinate values of the 24 points are respectively $(a^*, b^*) = (150, 0)$, $(150, 150)$, $(0, 150)$, $(-150, 150)$, $(-150, 0)$, $(-150, -150)$, $(0, -150)$, and $(150, -150)$.

The optimization unit 106 optimizes control parameters (moving directions and amounts, and compression ratios to the center of control points) to optimize the reference color space so that a graphic which expresses ellipse approximation data is got closer to a perfect circle (step S16), as will be described in detail later.

The conversion parameter generation unit 107 generates conversion parameters required to convert arbitrary points in the control region into those on the uniform color appearance space based on the optimized control parameters (step S17). Note that the subsequent processes will be explained under the assumption that a look-up table (LUT) is generated as the conversion parameters.

A description example of the LUT generated by the conversion parameter generation unit 107 will be described below with reference to FIG. 10. The conversion parameter generation unit 107 generates grids which include the control region of the reference color space and are obtained by respectively slicing $L^*$, $a^*$, and $b^*$ ranges of the control region into 33, and describes color space values on the uniform color appearance space as a conversion destination in respective grid points. Then, the conversion parameter generation unit 107 converts the color space values in the grid points (to be described in detail later), thus generating a table which represents the correspondence relationship between the color space values on the reference color space and those on the uniform color appearance space.

The output unit 108 saves the LUT as the generated conversion parameters in the HDD 203 or recording medium 208 as data of the file name set in the input area 1003 (step S17). By executing interpolation calculations (for example, tetrahedral interpolation calculations or cubic interpolation calculations) which look up this LUT, color space values at arbitrary points in the control region can be converted into those on the uniform color appearance space.

Optimization Unit

A state in which a graphic which expresses ellipse approximation data is got closer to a perfect circle by optimizing the control parameters (movements and compression ratios of the control points) will be described below with reference to the conceptual graphs shown in FIGS. 11A and 11B. Note that FIGS. 11A and 11B show not only the control points but also the grid points for the sake of descriptive convenience. That is, the optimization unit 106 moves positions of the respective set control points and changes compression ratios to the center of the respective control points to shrink the graphic (FIG. 11A) which expresses the elliptic approximation data so as to correct a form of the graphic which gets closer to a perfect circle (FIG. 11B).

Figure 12:
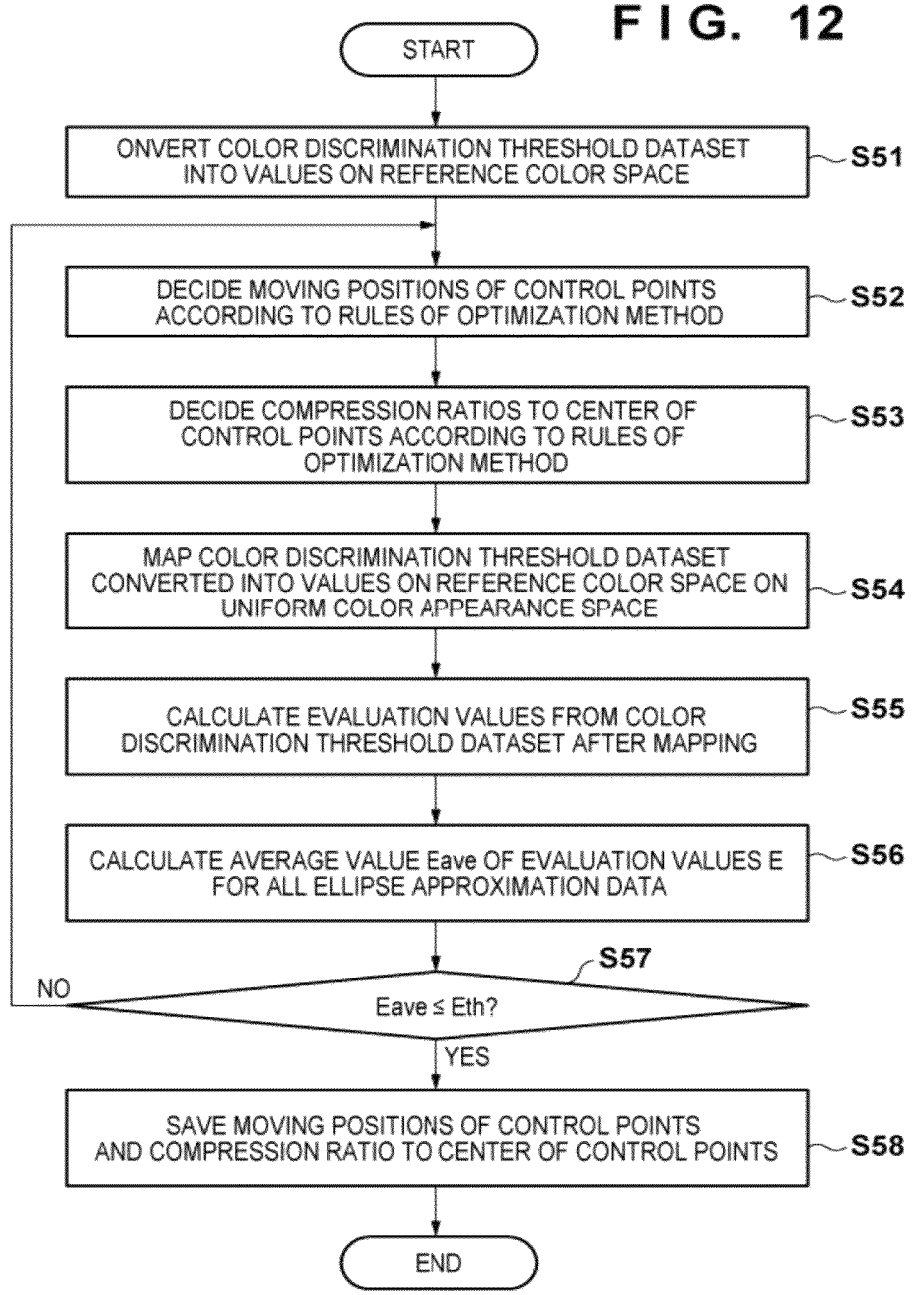
FIG. 12 is a flowchart for explaining details of processing of an optimization unit.

Details of the processing (step S16) of the optimization unit 106 will be described below with reference to the flowchart shown in FIG. 12. The optimization unit 106 converts the color discrimination threshold dataset into values on the CIELAB space (reference color space) (step S51) using:

if $(Y/Yw > 0.008856)$ $L^* = 116(Y/Yw)^{1/3} - 16;$ else $L^* = 903.29 \times Y/Yw;$ if $(X/Xw > 0.008856)$ $f(X/Xw) = (X/Xw)^{1/3};$ else $f(X/Xw) = 7.78 \times X/Xw + 16/116;$ if $(Y/Yw > 0.008856)$ $f(Y/Yw) = (Y/Yw)^{1/3};$ else $f(Y/Yw) = 7.78 \times Y/Yw + 16/116;$ if $(Z/Zw > 0.008856)$ $f(Z/Zw) = (Z/Zw)^{1/3};$ else $f(Z/Zw) = 7.78 \times Z/Zw + 16/116;$ $a^* = 500\{f(X/Xw) - f(Y/Yw)\};$ $b^* = 200\{f(Y/Yw) - f(Z/Zw)\};$ \hfill (1)

where Xw, Yw, and Zw are XYZ values of a white point.

Note that when the color discrimination threshold dataset has already been converted into values on the reference color space, this conversion can be omitted.

As the white point used in the calculations, a white point in an environment in which colors are to be viewed actually (to be referred to as a viewing environment hereinafter) is used. For this reason, when a generation environment of the color discrimination threshold dataset is different from the viewing environment, the optimization unit 106 preferably executes processing for converting CIE tristimulus values XYZ of the color discrimination threshold dataset into XYZ values under the viewing environment. Note that conversion to XYZ values under the viewing environment uses, for example, a Von Kries conversion formula or Bradford conversion formula.

Next, the optimization unit 106 executes processing using an optimization method such as a Newton method, damped least squares method, or steepest descent method. That is, the optimization unit 106 decides moving positions of the respective control points according to rules of the optimization method (step S52), and decides compression ratios to the center of the respective control points according to rules of the optimization method (step S53).

The relationship between the control points and center will be described below with reference to FIG. 13. As shown in FIG. 13, a center corresponds to an achromatic point 1103, which has a lightness level equal to those of control points 1102, on the L* axis. A compression ratio is a parameter required to decide a moving position of a point which is located at an intermediate position between each control point 1102 and the achromatic point 1103 (to be referred to as an intermediate point hereinafter) with respect to the moving position of that control point 1102. Movement of the intermediate point will be described below with reference to FIG. 14. The moving position of the intermediate point is decided by:

$$\vec{x}' = (|\vec{x}|/|\vec{p}|)^\gamma \cdot \vec{p}' \hfill (2)$$

where $\vec{x}$ is a position vector of an intermediate point 1104, $\vec{x}'$ is a position vector of the intermediate point 1104 after movement, $\vec{p}$ is a position vector of the control point 1102, $\vec{p}'$ is a position vector of the control point 1102 after movement, and $\gamma$ is a compression ratio $(0 \leq \gamma \leq 1)$.

Next, the optimization unit 106 maps the color discrimination threshold dataset, whose values are converted into those on the CIELAB space (reference color space), on a uniform color appearance space using equation (2) and interpolation calculations (step S54). Mapping of the color discrimination threshold dataset will be described below with reference to FIG. 15. For example, assume that ellipse approximation data 1105 is located in a region enclosed by four control points 1102a to 1102d and two achromatic points 1103a and 1103b. In this case, an a* component of the ellipse approximation data 1105 is projected onto $\vec{pb}$ and $\vec{pd}$, and a $\sqrt{(a^{*}+b^{*})}$ component is projected onto $\vec{pa}$ and $\vec{pc}$ to calculate equation (2). Then, these calculation results undergo interpolation calculations to obtain ellipse approximation data after mapping. Note that the interpolation calculations are not limited to linear or nonlinear interpolation, and an arbitrary method can be used.

Then, the optimization unit 106 calculates evaluation values from the color discrimination threshold dataset after mapping (step S55). The evaluation value can be a value which expresses a perfect circle likeliness of a graphic that represents the elliptic approximation data after conversion, and is calculated using, for example:

$$E = \Sigma/1 - \sqrt{\{(L^*_c - L^*_i)^2 + (a^*_c - a^*_i)^2 + (b^*_c - b^*_i)^2\}}/4 \hfill (3)$$

where a $\Sigma$ calculation range is i=1 to 4, $(L^*_c, a^*_c, b^*_c)$ are central coordinates of the elliptic approximation data after conversion, and $(L^*_i, a^*_i, b^*_i)$ are end point coordinates of the elliptic approximation data after conversion.

In the above equation, when a graphic which represents the elliptic approximation data after conversion is a perfect circle, the evaluation value E assumes zero.

The optimization unit 106 then calculates an average value Eave of the evaluation values E for all elliptic approximation data (step S56), and determines whether or not the average value Eave is smaller than a predetermined threshold Eth (step S57). The threshold is adjusted according to required precision of uniformity of the color space. If the average evaluation value is larger than the threshold (Eave>Eth), the process returns to step S52, and the processes in steps S52 to S56 are repeated until the average evaluation value becomes equal to or smaller than the threshold (Eave≤Eth). Then, if Eave≤Eth, the optimization unit 106 judges that the optimization has converged.

After the optimization has converged, the optimization unit 106 saves the moving positions of the respective control points (coordinates of the 24 points), and the compression ratios to the center of the respective control points (24 γ values) as the optimization result in a predetermined area of the main memory 202 (step S58).

In this way, the control region is set on the non-uniform color appearance space, the control points are set at boundaries of the control region, and a graphic that represents the color discrimination threshold dataset is got closer to a perfect circle using the positions of the control points and the compression ratios to the center of the control points as the control parameters, thereby configuring the uniform color appearance space. Therefore, the smooth uniform color appearance space which is free from any locally abrupt changes can be generated within a short period of time.

Figure 26A:
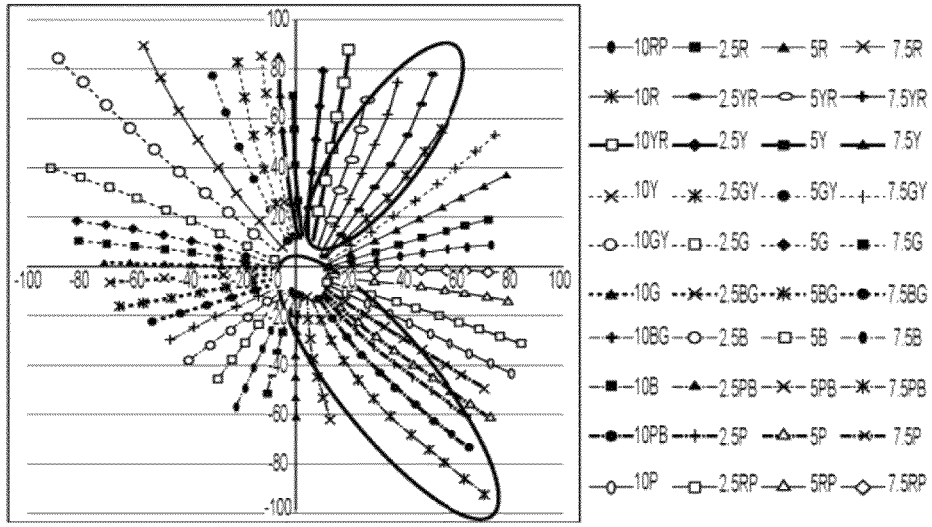
FIGS. 26A and 26B are graphs showing hue linearity of a uniform color appearance space.
Figure 26B:
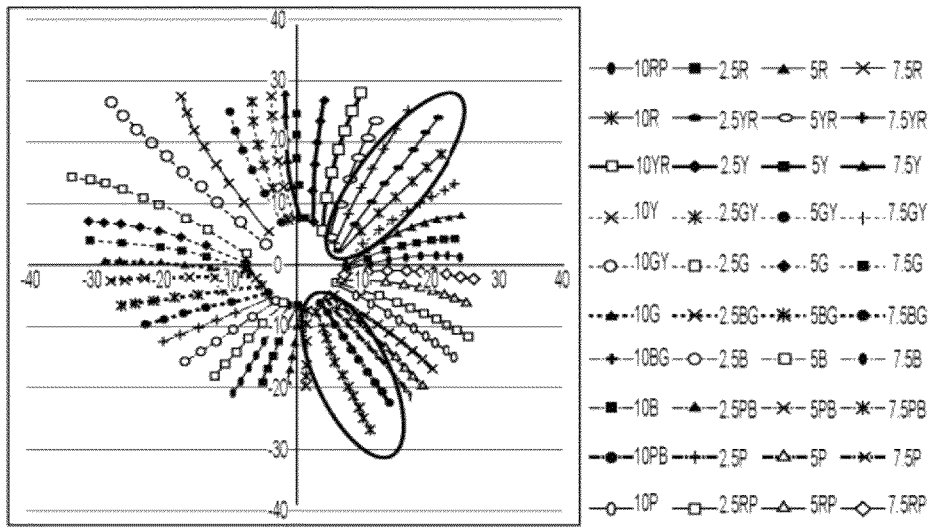

Using this method, hue linearity of the color space with respect to vision can also be improved. FIGS. 26A and 26B are graphs in which visual uniform hue data at respective hues of Munsell renovation data are plotted on the CIELAB color space and the uniform color appearance space generated using the conversion parameters obtained by the method of this embodiment. As can be seen from FIG. 26A, on the CIELAB color space, visual uniform hue data for red and blue hues are largely curved (regions bounded by solid curves in FIG. 26A). By contrast, as can be seen from FIG. 26B, on the uniform color appearance space, they are improved. It is confirmed on the uniform color appearance space using the method of this embodiment that uniform hue data of Munsell renovation data can be expressed within a hue difference $\Delta h \leq 3$ at each hue.

When hue differences are calculated using other visual uniform hue data generated by a subjective evaluation experiment such as uniform hue lines calculated by Ebner et. al. (see below), a color space within a hue difference $\Delta h \leq 3$ degree can be generated. In other words, an uniform appearance color space is a color space which expresses a color data group such as visual uniform hue data or the like which are perceived as identical hues by human within a predetermined hue difference.

Fritz Ebner, and Mark D. Fairchild "Finding constant hue surfaces in color space" SPIE Vol. 3300

Second Embodiment

A color processing apparatus and color processing method according to the second embodiment of the present invention will be described below. Note that the same reference numerals in the second embodiment denote the same components as those in the first embodiment, and a detailed description thereof will not be repeated.

The first embodiment has explained the processing example in which the predetermined control region is set, and the control points are set on the control region to convert the non-uniform color appearance space into the uniform color appearance space. The second embodiment will explain a method of generating the uniform color appearance space according to more detailed user instructions. Differences from the first embodiment are processing of the UI display unit 102, that of the control point setting unit 105, and that of the optimization unit 106.

Figure 16:
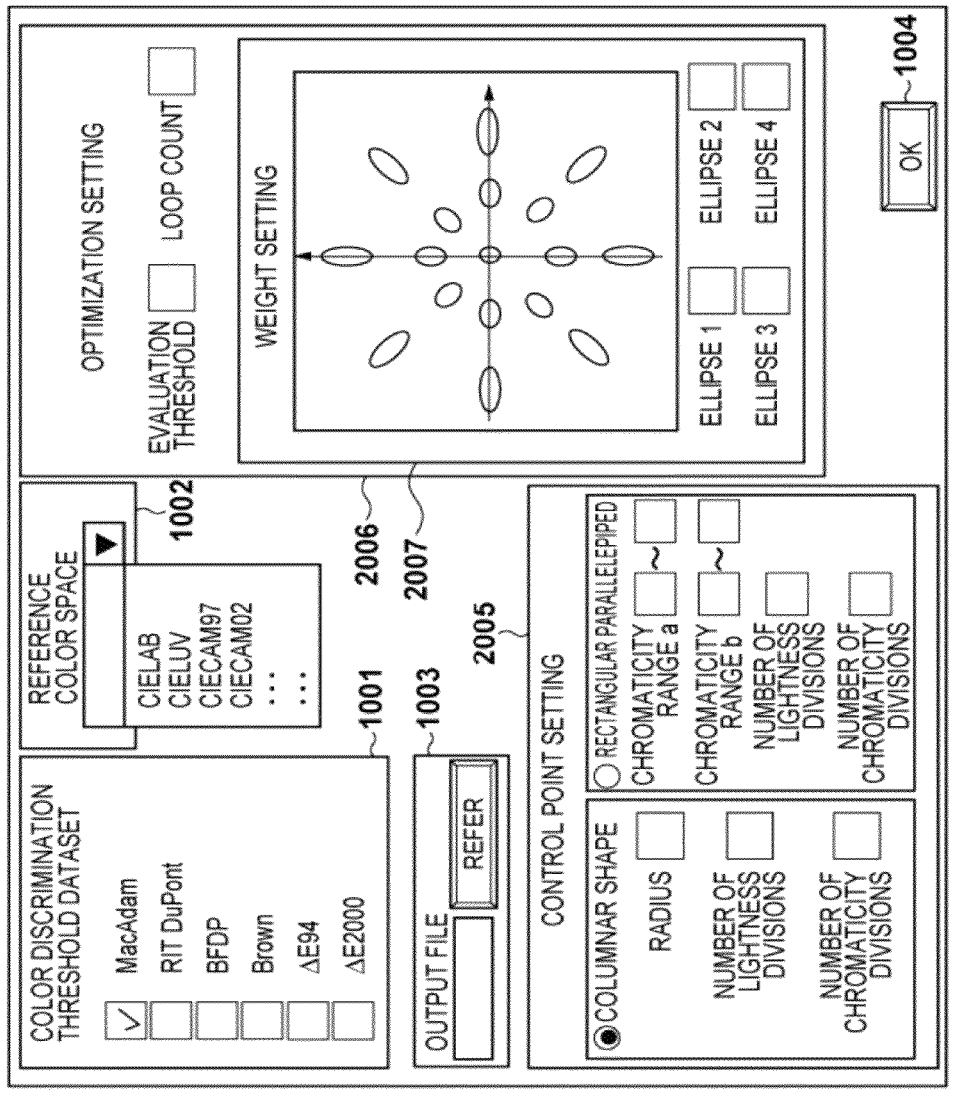
FIG. 16 is a view showing an example of a UI displayed by a UI display unit according to the second embodiment.

FIG. 16 shows an example of a UI displayed by the UI display unit 102 of the second embodiment. On the UI of the second embodiment, a control point setting area 2005 and optimization setting area 2006 are added to the UI of the first embodiment shown in FIG. 5.

The user can set a shape of the control region by operating the control point setting area 2005. In the first embodiment, as an example of the control region, a rectangular parallelepiped of $0 \leq L^* \leq 100$, $-150 \leq a^* \leq 150$, and $-150 \leq b^* \leq 150$ is defined. In the second embodiment, a columnar shape can also be set in addition to the rectangular parallelepiped. Also, the user can input a radius when he or she selects a columnar shape or a chromaticity range when he or she selects a control region of the rectangular parallelepiped, and can freely set the size of the control region.

The first embodiment has exemplified the case in which a total of 24 control points, that is, eight points at uniform lightness levels×3 stages, are set. In the second embodiment, the user can set the number of lightness divisions and the number of chromaticity divisions by operating the UI. The control point setting unit 105 sets the control region instructed via the UI.

Also, the user can set a threshold Eth of an evaluation value, a loop count, weights for respective elliptic approximation data, and the like in optimization by operating the optimization setting area 2006. The threshold Eth is an end condition of the optimization, and is, for example, 0.5 in the first embodiment. However, in the second embodiment, the user can arbitrarily designate the threshold Eth. Likewise, the loop count is also the end condition of the optimization. When the loop count reaches a value designated by the user, the optimization ends.

When there is an area in which uniformity is especially calculated on a uniform color appearance space to be generated, the user can set weights for elliptic approximation data. For example, the user designates an ellipse (corresponding to elliptic approximation data) of a color area to which he or she attaches particular importance on a weight setting area 2007 on the UI, and sets a weight (numerical value) of that ellipse. For example, for a color region including an ellipse set with a weight=5, uniformity precision five times of other areas can be expected.

Optimization Unit

Figure 17:
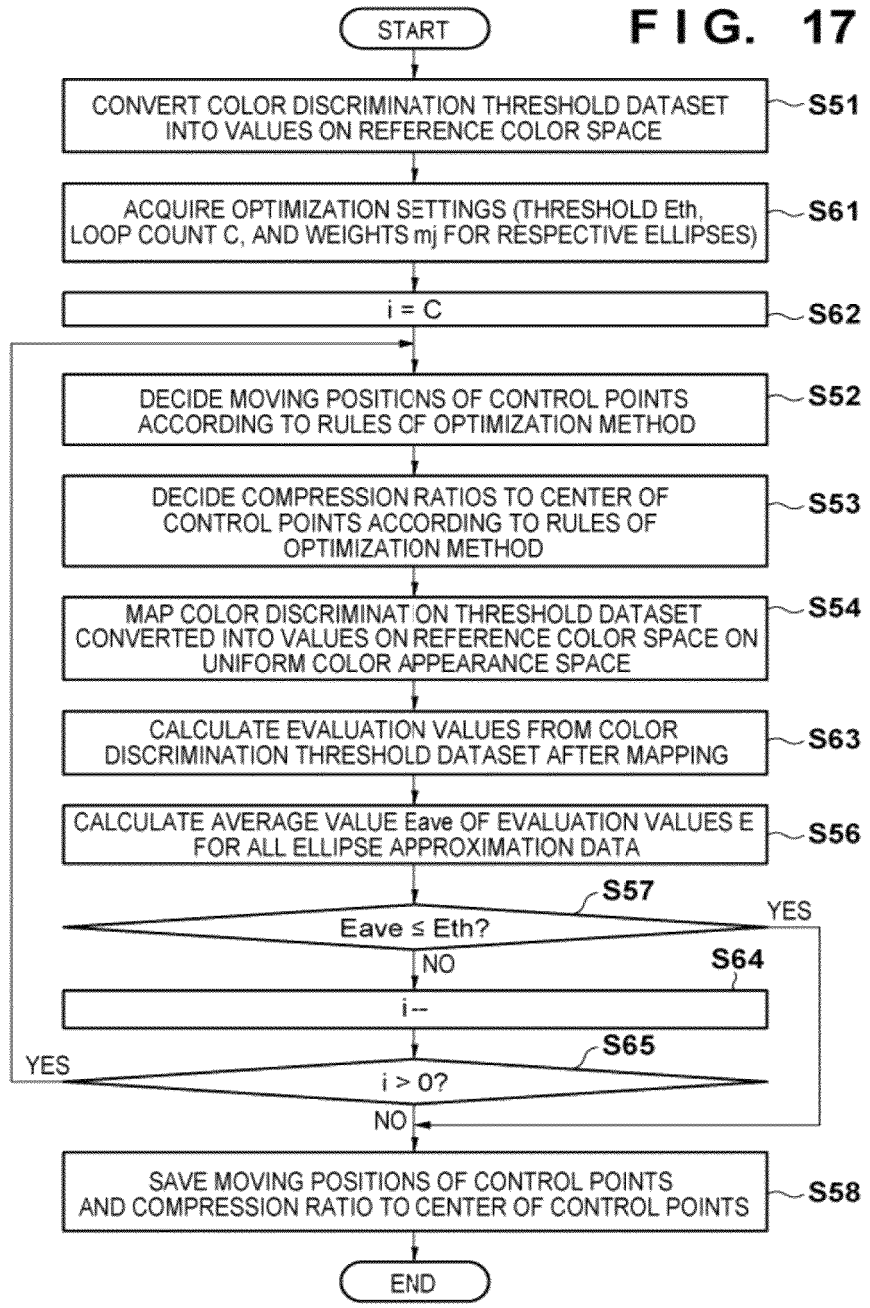
FIG. 17 is a flowchart for explaining details of processing of an optimization unit.

Details of the processing (step S16) of the optimization unit 106 will be described below with reference to the flowchart shown in FIG. 17. The optimization unit 106 converts a color discrimination threshold dataset into values on the CIELAB space (reference color space) using expressions (1) (step S51) as in the first embodiment.

The optimization unit 106 then acquires settings (threshold Eth, loop count C, and weights $m_j$ for respective ellipses) on the optimization setting area 2006 of the UI (step S61). Note that "j" of the weight $m_j$ is a suffix indicating a given ellipse. Then, the optimization unit 106 sets the loop count C in counter i (step S62).

Steps S52 to S54 are the same processes as those in the first embodiment, and a detailed description thereof will not be repeated.

Next, the optimization unit 106 calculates evaluation values from the color discrimination threshold dataset after mapping as in the first embodiment (step S63). In the second embodiment, the optimization unit 106 uses:

$$E = m_j \Sigma [1 - \sqrt{\{(L^*_c - L^*_i)^2 + (a^*_c - a^*_i)^2 + (b_c - b^*_i)^2\}}]/4 \quad (4)$$

where a $\Sigma$ calculation range is i=1 to 4.

In equation (4), a difference from equation (3) of the first embodiment is to calculate a product with the weight $m_j$. By calculating a product with the weight of an ellipse designated by the user, an evaluation value, which worsens a uniformity evaluation value of that ellipse in correspondence with the weight, is obtained. Then, a color area including that ellipse is evaluated more strictly than a color area without setting any weight, resulting in easier improvement of uniformity.

The optimization unit 106 then calculates an average value Eave of evaluation values E for all elliptic approximation data (step S56) as in the first embodiment, and determines whether or not the average value Eave is smaller than the threshold Eth designated by the user (step S57). If Eave>Eth, the optimization unit 106 decrements counter i (step S64). If counter i>0, the process returns to step S52 to repeat the processes in steps S52 to S56 until Eave≤Eth or i=0. If Eave≤Eth or i=0, the optimization unit 106 ends the optimization.

After the optimization ends, the optimization unit 106 saves control parameters (moving positions of respective control points and compression ratios to the center of the respective control points) as the optimization result in a predetermined area of the main memory 202 (step S58) as in the first embodiment. The numbers of control points and compression ratios are decided based on the conditions which are set by the user by operating the control point setting area 2005.

In this manner, the user can arbitrarily set the control region and control points. Thus, for example, the user can select processing which prioritizes a processing time by narrowing down the control region and decreasing the number of control points. Also, the user can select processing which prioritizes precision by broadening the control region and increasing the number of control points. Furthermore, for example, when there is an area to uniformity of which the user wants to attach particular importance, he or she can manipulate the optimization parameters.

Third Embodiment

A color processing apparatus and color processing method according to the third embodiment of the present invention will be described below. Note that the same reference numerals in the third embodiment denote the same components as those in the first and second embodiments, and a detailed description thereof will not be repeated.

The first and second embodiments have explained the processing example in which the non-uniform color appearance space is converted into the uniform color appearance space. The third embodiment will explain a processing example in which a color matching profile is generated using the uniform color appearance space.

Figure 18:
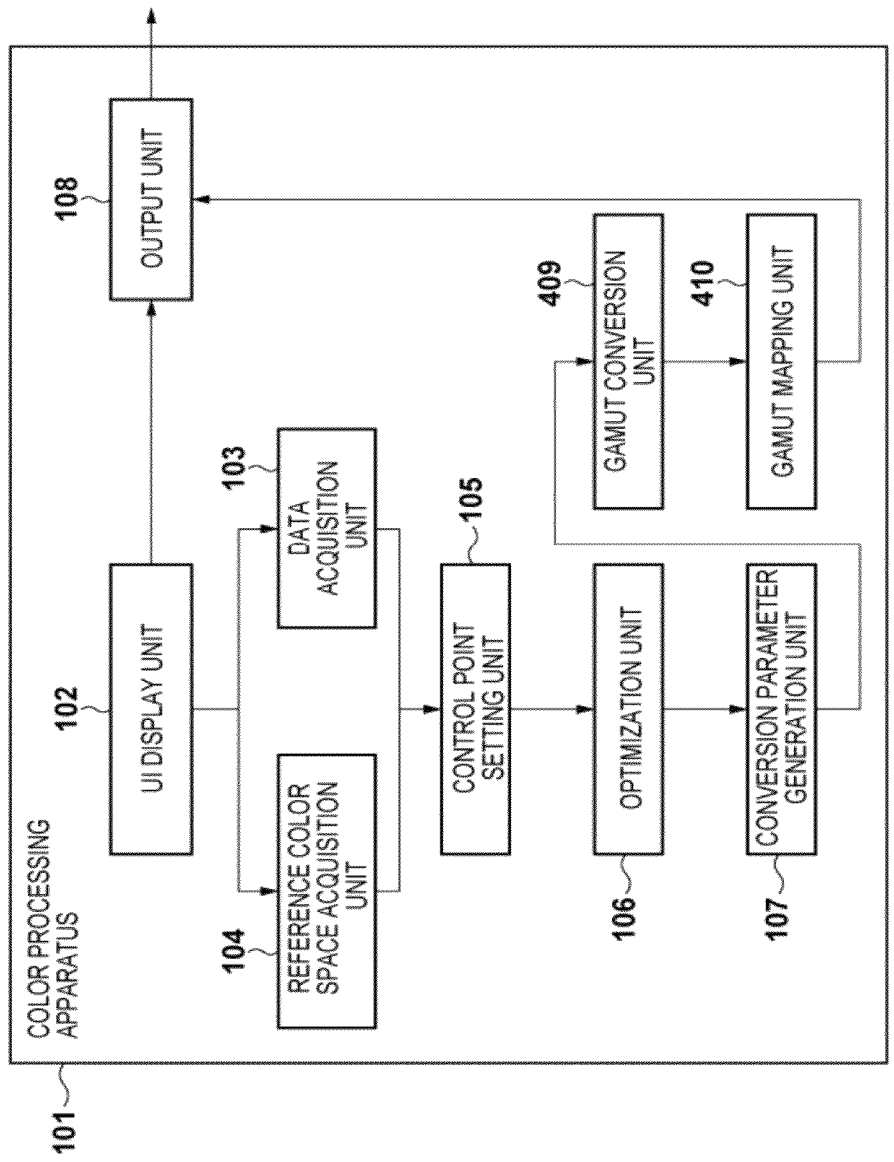
FIG. 18 is a block diagram for explaining the logical arrangement of a color processing apparatus according to the third embodiment.

The logical arrangement of the color processing apparatus 101 according to the third embodiment will be described below with reference to the block diagram shown in FIG. 18. Note that the arrangement shown in FIG. 18 is implemented when the CPU 201 executes the AP. The color processing apparatus 101 of the third embodiment has an arrangement in which a gamut conversion unit 409 and gamut mapping unit 410 are added to the logical arrangement of the first embodiment. The gamut conversion unit 409 and gamut mapping unit 410 generate a color profile using the conversion parameters (or LUT) generated in step S17 shown in FIG. 4.

Figure 19:
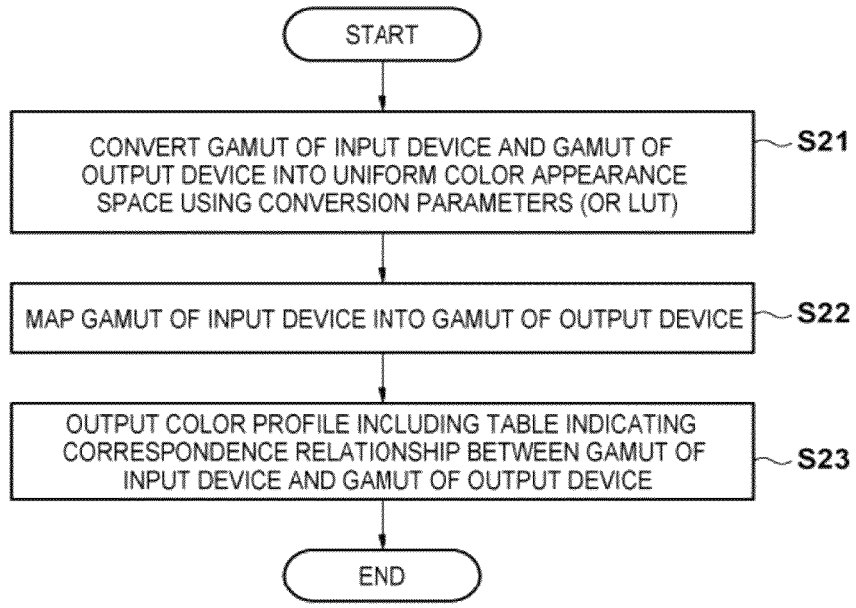
FIG. 19 is a flowchart for explaining processing of a gamut conversion unit and gamut mapping unit.

The processing of the gamut conversion unit 409 and gamut mapping unit 410 will be described below with reference to the flowchart shown in FIG. 19.

The gamut conversion unit 409 converts, using the conversion parameters (or LUT), a gamut of an input device (for example, a scanner or digital camera) and that of an output device (for example, a printer), which are designated by the user via a UI, into a uniform color appearance space (step S21). The gamut mapping unit 410 maps the gamut of the input device into that of the output device (step S22). The output unit 108 outputs a color profile including a table indicating the correspondence relationship between the gamuts of the input device and output device (step S23).

Note that the gamuts of the input device and output device have to be expressed using the same color space as the reference color space used upon generation of the conversion parameters (or LUT). If one or both of these gamuts are expressed using a color space different from the reference color space, that gamut need only be converted into the same color space as the reference color space.

Figure 20:
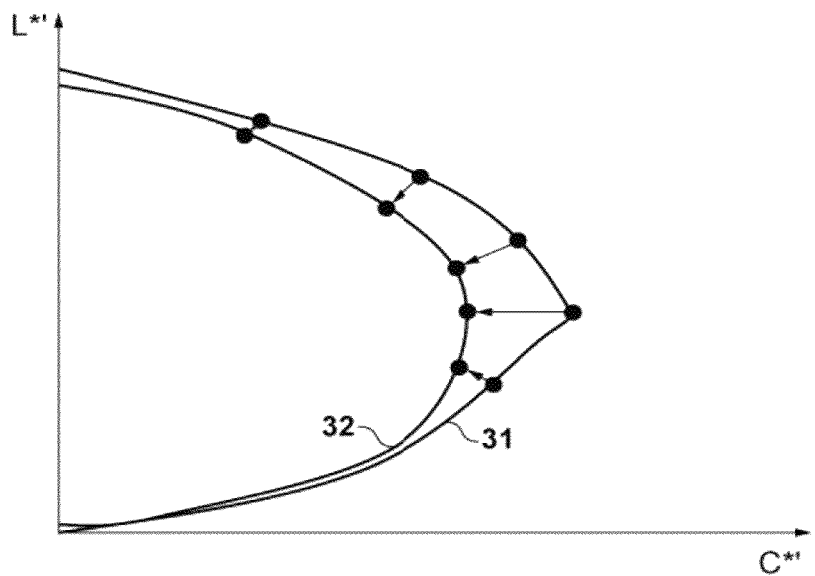
FIG. 20 is a graph for explaining gamut mapping on a uniform color appearance space.

Gamut mapping on the uniform color appearance space will be described below with reference to FIG. 20. Upon execution of gamut mapping on a uniform color appearance space L*'C*', mapping is very easy. That is, as shown in FIG. 20, a gamut boundary 31 of the input device need only be mapped on a gamut boundary 32 of the output device having a minimum distance, thus allowing gamut mapping that matches appearance. Note that inside the gamut, mapping can be done by a known method.

In this manner, a color profile can be generated using the uniform color appearance space which matches appearance, that is, a color profile that allows to obtain an image which matches human appearance can be generated by a very simple method.

Fourth Embodiment

A color processing apparatus and color processing method according to the fourth embodiment will be described below. Note that the same reference numerals in the fourth embodiment denote the same components as those in the first to third embodiments, and a detailed description thereof will not be repeated.

The first to third embodiments have explained the method of generating the conversion parameters required to convert the non-uniform color appearance space into the uniform color appearance space under a certain viewing environment (D65 light source) by optimization processing, and the method of generating a profile using the parameters. The fourth embodiment will explain a method of generating conversion parameters under a different viewing environment in real time using those which are generated by the optimization processing under a reference viewing environment.

Since a color space is distorted with respect to visual characteristics in different ways depending on viewing environments, the conversion parameters required to convert the CIELAB space used in the first to third embodiments into the uniform color appearance space can be used only for CIELAB values under the D65 light source as a reference viewing environment upon generation of the parameters.

Figure 21:
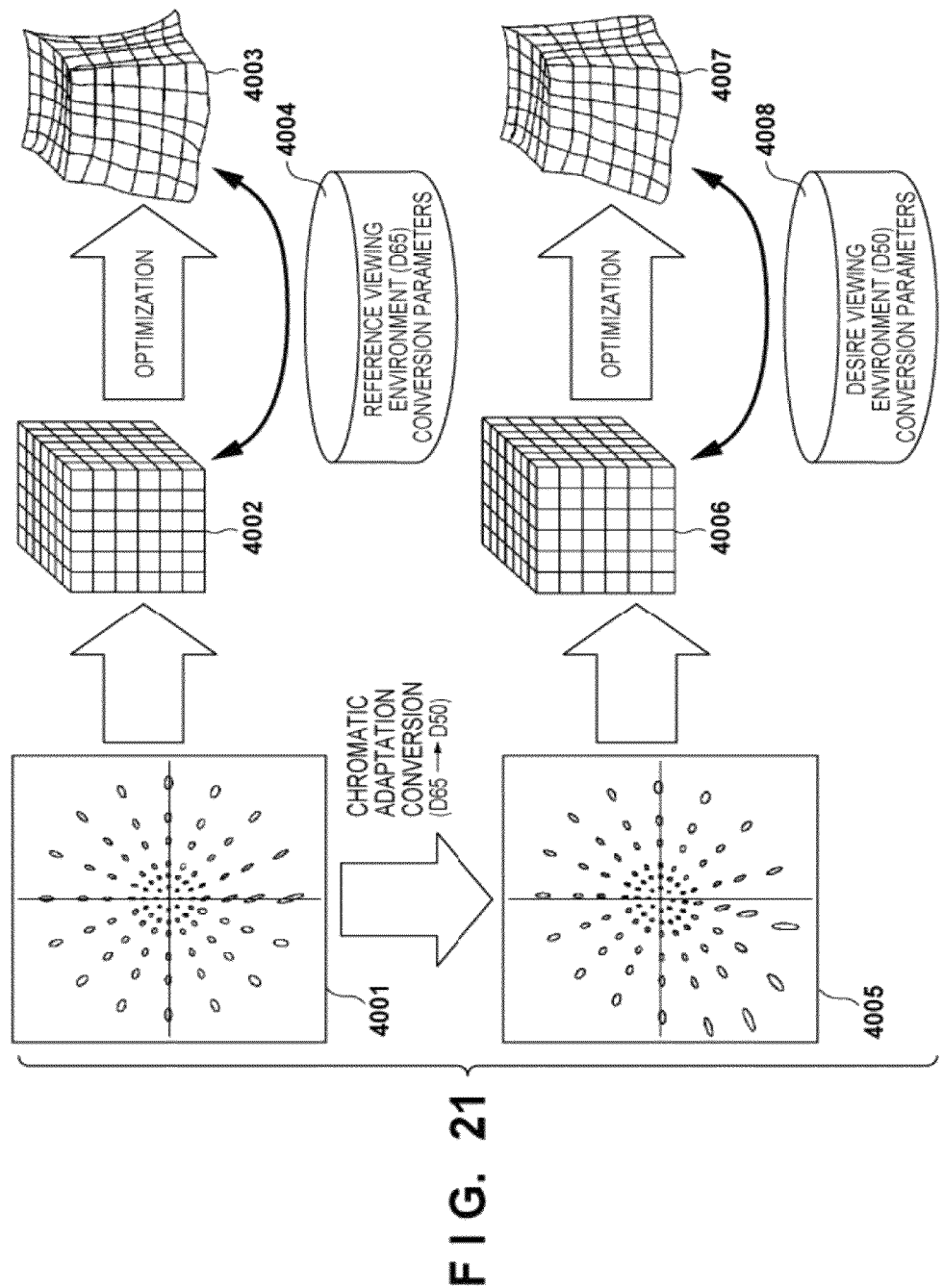
FIG. 21 is a schematic view of a method of generating conversion parameters by executing optimization for each viewing environment.

However, various viewing environments such as a D50 light source as a standard illumination at the time of evaluation of print colors, and a three-wavelength type fluorescent lamp (F10) popularly used in, for example, an office are assumed in the world. In order to calculate conversion parameters of different viewing environments, in the method of the first to third embodiments, the optimization processing has to be executed after processing for converting CIE tristimulus values XYZ of a color discrimination threshold dataset under the reference viewing environment into XYZ values under a viewing environment. FIG. 21 shows a conceptual view of this method. The following description will be given under the assumption that the reference viewing environment uses D65, and a viewing environment uses D50.

As shown in FIG. 21, output grid points 4003 are calculated by optimizing positions of set input grid points 4002, so that a color discrimination threshold dataset 4001 on the CIELAB space of the D65 light source is got closer to a perfect circle. The correspondence relationship between the input grid points 4002 and the output grid points 4003 is conversion parameters 4004 under the reference viewing environment (D65).

In order to calculate conversion parameters of the viewing environment, the color discrimination threshold dataset 4001 on the CIELAB space of the D65 light source is converted into a color discrimination threshold dataset 4005 under the viewing environment (D50). Conversion into the color discrimination threshold dataset under the viewing environment uses, for example, a chromatic adaptation conversion formula such as a Von Kries conversion formula or Bradford conversion formula. Colors under the viewing environment, which are calculated using the chromatic adaptation conversion formula are those, which appear to be equal to colors under the reference viewing environment, under the viewing environment. As the method of calculating the color discrimination threshold dataset of the viewing environment, a method using chromatic adaptation conversion has been explained. Alternatively, a dataset generated by executing, for example, color matching tests under the viewing environment may be used as the color discrimination threshold dataset.

As for the latter conversion, output grid points 4007 are calculated by optimizing positions of set input grid points 4006, so that the color discrimination threshold dataset 4005 is got closer to a perfect circle, in the same manner as generation of the conversion parameters of the reference viewing environment (D65). The correspondence relationship between those grid points is conversion parameters 4008 under the viewing environment (D50).

With the aforementioned method, conversion parameters under different viewing environments can be calculated. However, since the optimization processing for calculating the output grid points 4007 obtained by optimizing the positions of the input grid points 4006 requires a long period of time, it is difficult to generate the conversion parameters in real time when the optimization processing is executed for each viewing environment.

A method of calculating conversion parameters under a plurality of viewing environments in advance, and selecting the corresponding parameters from them may be used. However, for example, upon generation of a color matching profile, since a white point under a viewing environment of the user is measured, and a profile corresponding to the measured white point is generated, it is difficult to generate conversion parameters in advance under an arbitrary viewing environment.

Figure 22:
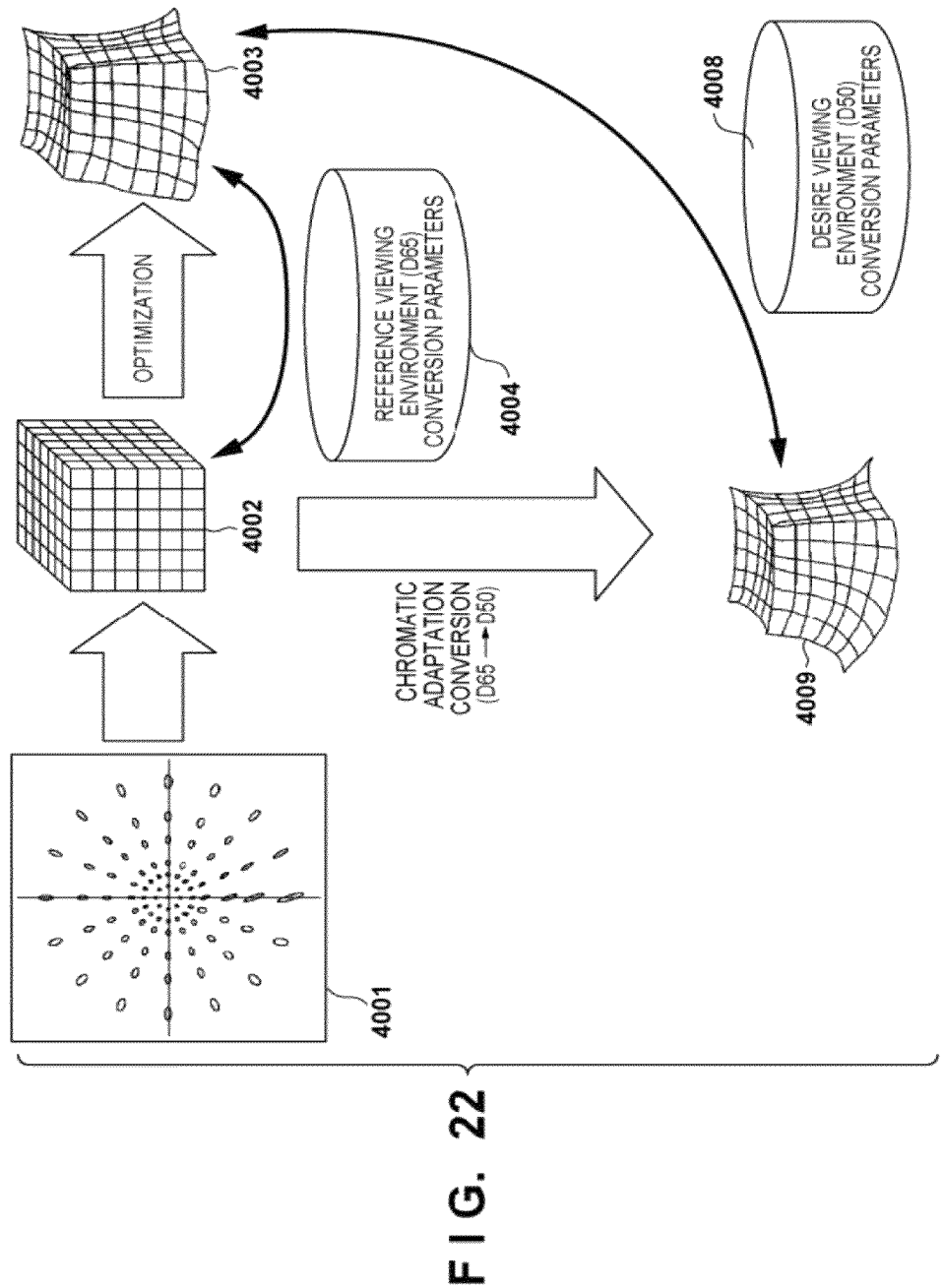
FIG. 22 is a schematic view showing a color conversion parameter generation method according to the fourth embodiment.

Hence, the fourth embodiment will explain a method of calculating only conversion parameters under the reference viewing environment in advance, and calculating conversion parameters under a viewing environment without executing any optimization processing under that viewing environment. FIG. 22 shows a conceptual view of this method. The following description will also be given under the assumption that the reference viewing environment uses D65 and the viewing environment uses D50.

The conversion parameters 4004 for converting the reference viewing environment (D65) into the uniform color appearance space are calculated in advance by the aforementioned method. Next, the input grid points 4002 of the reference viewing environment are converted into input grid points 4009 of the viewing environment using chromatic adaptation conversion processing, and conversion parameters 4008 for converting the viewing environment into the uniform color appearance space are calculated by associating the converted input grid points 4009 with the output grid points 4003, which are calculated by the optimization processing under the reference viewing environment.

[Logical Arrangement]

Figure 23:
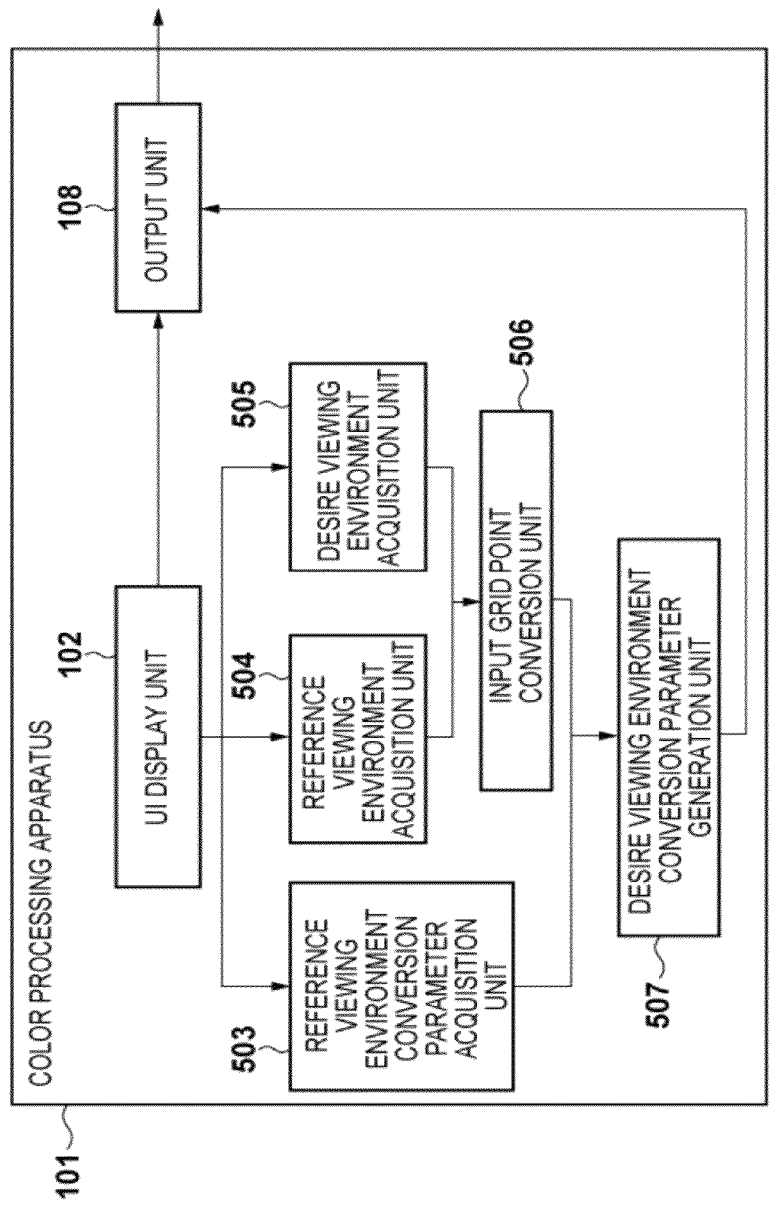
FIG. 23 is a block diagram for explaining the logical arrangement of a color processing apparatus according to the fourth embodiment.

The logical arrangement of the color processing apparatus 101 of the fourth embodiment will be described below with reference to the block diagram shown in FIG. 23. Note that the arrangement shown in FIG. 23 is implemented when the CPU 201 executes the AP.

In the color processing apparatus 101, a UI display unit 102 displays a UI on the monitor 205. A reference viewing environment conversion parameter acquisition unit 503 acquires conversion parameters (LUT), which are generated in advance by the method of the first or second embodiment, and are required to execute conversion into a uniform color appearance space under the reference viewing environment, from the HDD 203, recording medium 208, or the like. Note that the conversion parameters for converting the reference viewing environment into the uniform color appearance space is to be referred to as a "reference viewing environment conversion parameters" hereinafter.

A reference viewing environment acquisition unit 504 acquires, from the UI, data of reference viewing environment used upon generation of the reference viewing environment conversion parameters acquired by the reference viewing environment conversion parameter acquisition unit 503. A viewing environment acquisition unit 505 acquires, from the UI, data of viewing environment, which is designated by the user and conversion parameters of which are required. Note that the viewing environment of which the conversion parameters are required is to be referred to as a "desire viewing environment" hereinafter.

An input grid point conversion unit 506 converts input grid points of the reference viewing environment into those of the desire viewing environment using the chromatic adaptation conversion formula. That is, the input grid point conversion unit 506 sets grid points which represent colors under the viewing environment, which appear to be equal to colors of the input grid points, as the input grid points after conversion.

A viewing environment conversion parameter generation unit 507 generates conversion parameters (LUT) required to convert arbitrary colors under the viewing environment into the uniform color appearance space by associating the input grid points of the desire viewing environment obtained by the conversion of the input grid point conversion unit 506 and the reference viewing environment conversion parameters (LUT) acquired by the reference viewing environment conversion parameter acquisition unit 503. An output unit 108 outputs the conversion parameters generated by the viewing environment conversion parameter generation unit 507 to the HDD 203, recording medium 208, or the like as a data file.

[Color Processing]

Figure 24:
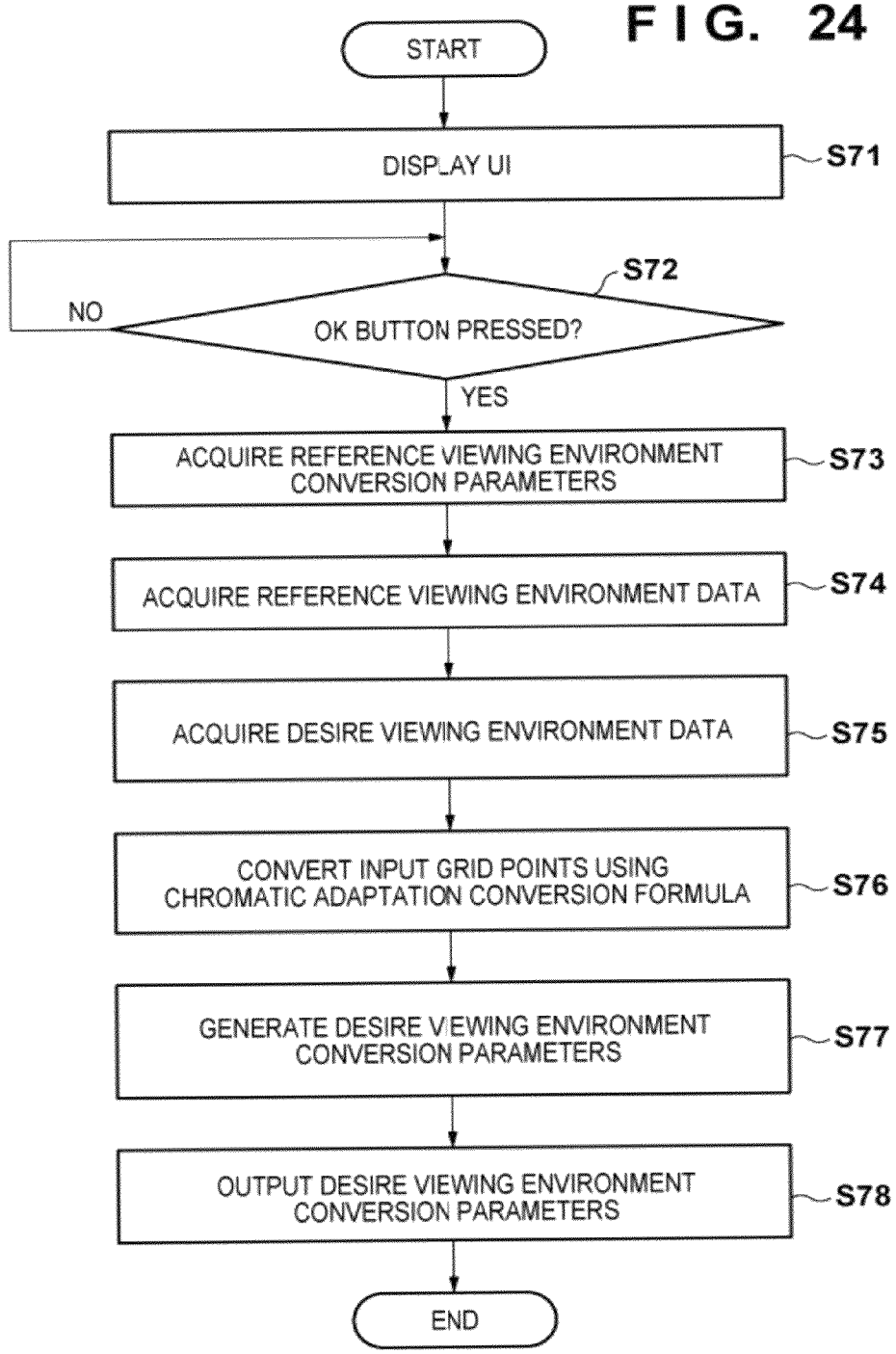
FIG. 24 is a flowchart for explaining processing executed by the color processing apparatus according to the fourth embodiment.

Processing executed by the color processing apparatus 101 will be described below with reference to the flowchart shown in FIG. 24.

Figure 25:
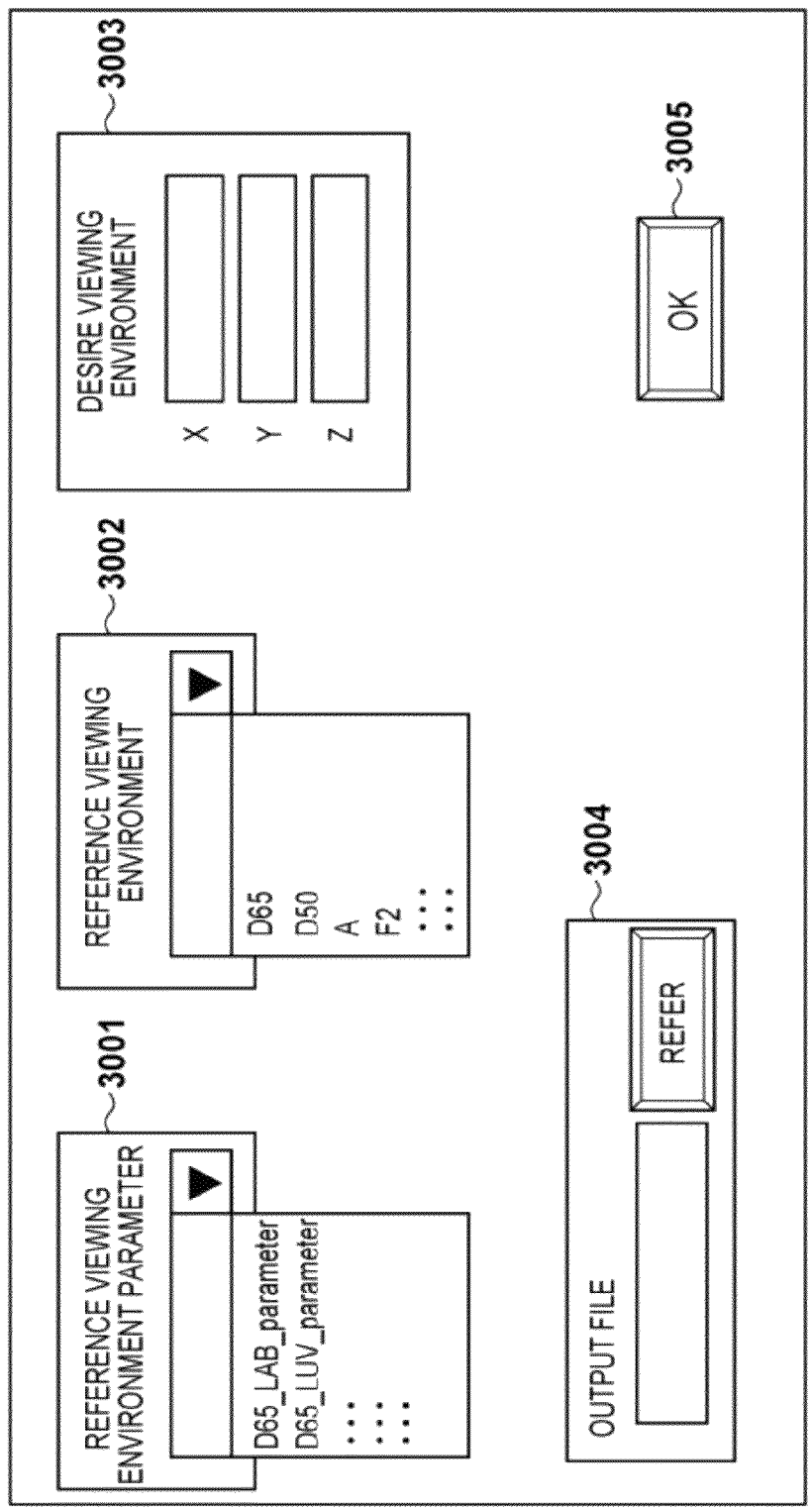
FIG. 25 is a view showing an example of a UI displayed by a UI display unit according to the fourth embodiment.

The UI display unit 102 displays a UI that allows the user to input information required for the subsequent processing on the monitor 205 (step S71). FIG. 25 shows an example of the UI displayed by the UI display unit 102. The user selects the reference viewing environment conversion parameters from a plurality of data stored in advance in the HDD 203, recording medium 208, or the like by operating an input area 3001. Note that only one set of reference viewing environment conversion parameters may be stored in advance.

The user selects a reference viewing environment used when the reference viewing environment conversion parameters to be used were calculated by operating an input area 3002. For example, the input area 3002 has a form of a drop combo box, and the user can select, for example, a "D65" light source, "D50" light source, "A" light source, or the like from a drop-down menu.

The user inputs CIE tristimulus XYZ values of a white point of the desire viewing environment by operating an input area 3003. In this embodiment, the XYZ values of the white point are input as information of the desire viewing environment. Alternatively, such information may be selected from predetermined light sources.

The user inputs a file name used upon saving conversion parameters which are generated by the color processing apparatus 101 and are required to convert a non-uniform color appearance space into a uniform color appearance space by operating an input area 3004.

After completion of selection of the reference viewing environment conversion parameters to be used, that of the reference viewing environment, input (or selection) of the desire viewing environment, and input of the file name, the user presses an OK button 3005 (step S72) to instruct to start processing.

Upon pressing of the OK button 3005, the reference viewing environment conversion parameter acquisition unit 503 acquires the reference viewing environment conversion parameters selected by the user from the HDD 203, recording medium 208, or the like (step S73).

Next, the reference viewing environment acquisition unit 504 acquires data of the reference viewing environment used upon generation of the reference viewing environment conversion parameters selected by the user from the HDD 203, recording medium 208, or the like (step S74). Note that the subsequent processing will be described under the assumption that "D65" is selected as the reference viewing environment.

The fourth embodiment will exemplify a case in which the reference viewing environment conversion parameter acquisition unit 503 and the reference viewing environment acquisition unit 504 are separately arranged. Alternatively, reference viewing environment information may be acquired together at the acquisition timing of the reference viewing environment conversion parameters, and the reference viewing environment acquisition unit 504 may be omitted. For example, the reference viewing environment conversion parameters may describe the reference viewing environment information, and data of the reference viewing environment may be acquired from there. At that time, the UI display unit 102 displays a UI from which the input area 3002 for reference viewing environment is removed, and which includes the input areas 3001, 3003, and 3004, and the OK button 3005.

The desire viewing environment acquisition unit 505 acquires data of the desire viewing environment input by the user from the HDD 203, recording medium 208, or the like (step S75). Note that the subsequent processing will be described under the assumption that "D50" is input as the desire viewing environment.

The input grid point conversion unit 506 converts input grid points set on the control region of the reference color space used upon generation of the reference viewing environment conversion parameters into color space values on the desire viewing environment using a chromatic adaptation conversion formula such as a Von Kries conversion formula or Bradford conversion formula (step S76).

Next, the desire viewing environment conversion parameter generation unit 507 generates conversion parameters for the desire viewing environment into the uniform color appearance space by associating the input grid points converted into the color space values of the desire viewing environment with the reference viewing environment conversion parameters (step S77). Note that the conversion parameters for the desire viewing environment into the uniform color appearance space is to be referred to as a "desire viewing environment conversion parameters" hereinafter.

The output unit 108 saves an LUT as the generated desire viewing environment conversion parameters in the HDD 203, recording medium 208, or the like as data having the file name input in the input area 3004 (step S78). By executing interpolation calculations (for example, tetrahedral interpolation calculations or cubic interpolation calculations) which look up this LUT, color space values at arbitrary points in the control region under the desire viewing environment can be converted into those on the uniform color appearance space.

For example, when the gamuts of the input device and output device are converted into the uniform color appearance space in step S21 in the third embodiment, even when viewing environments in regard to the input device and output device are different, the conversion parameters of the respective viewing environments can be generated in real time using the method of this embodiment, and color profiles for different viewing environments can be easily generated.

As described above, conversion parameters corresponding to a viewing environment designated by the user can be generated in real time, and a uniform color appearance space optimal to the viewing environment of the user can be generated in real time.

Fifth Embodiment

A color processing apparatus and color processing method according to the fifth embodiment of the present invention will be described below. Note that the same reference numerals in the fifth embodiment denote the same components as those in the first to fourth embodiments, and a detailed description thereof will not be repeated.

The first, second, and fourth embodiments have explained the generation processing of parameters required to convert a non-uniform color appearance space into a uniform color appearance space, and the third embodiment has explained the processing for generating a color matching profile using the uniform color appearance space. The fifth embodiment will explain processing for evaluating colors using the uniform color appearance space.

The logical arrangement of the color processing apparatus 101 of the fifth embodiment will be described below with reference to the block diagram shown in FIG. 27. Note that the arrangement shown in FIG. 27 is implemented when the CPU 201 executes the AP.

The color processing apparatus 101 of the fifth embodiment has an arrangement in which a color conversion unit 609 and color difference evaluation unit 610 are added to the logical arrangement of the first embodiment. The color conversion unit 609 and color difference evaluation unit 610 conduct color evaluation using conversion parameters (or LUT) generated in step S17 shown in FIG. 4. Note that the conversion parameters (or LUT) may be generated in advance.

Figure 28:
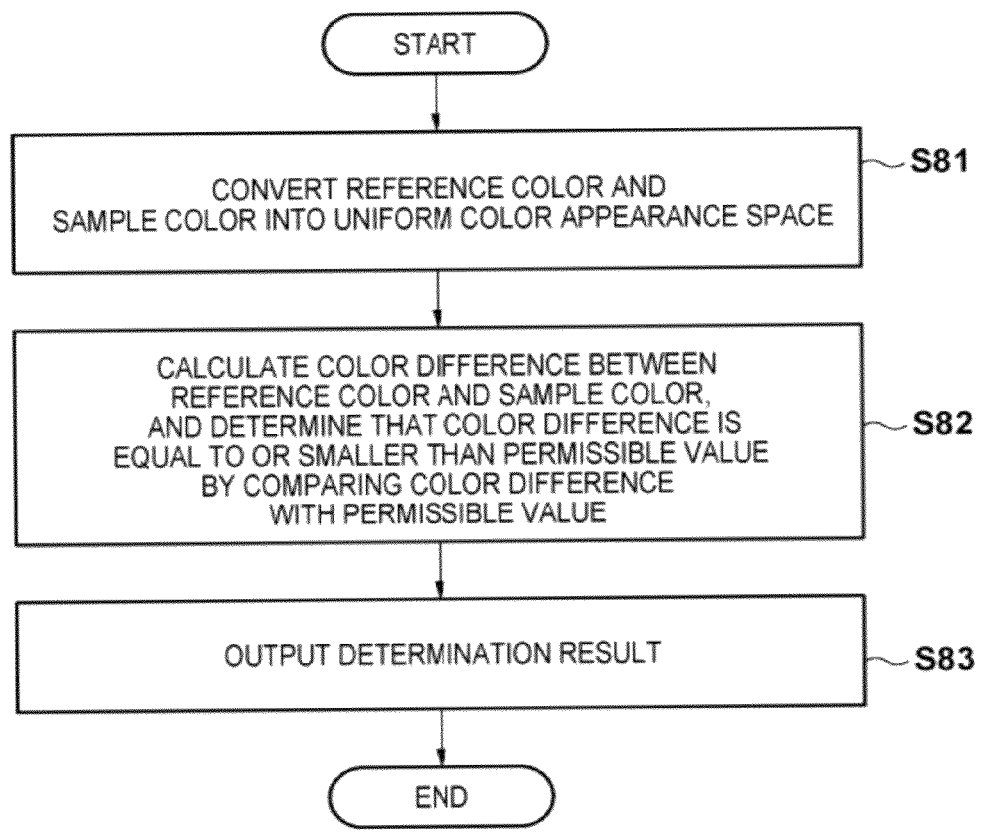
FIG. 28 is a flowchart for explaining color difference evaluation processing.

The processing of the color conversion unit 609 and color difference evaluation unit 610 will be described below with reference to the flowchart shown in FIG. 28.

The color conversion unit 609 converts, using the conversion parameters (or LUT), color values of reference colors (for example, measured values of color samples) and those of sample colors (for example, measured values of printed matter), which are designated by the user via a UI, into a uniform color appearance space (step S81). The color difference evaluation unit 610 calculates color differences between the reference colors and sample colors, and determines whether or not the color differences are equal to or smaller than an permissible value (step S82). The output unit 108 outputs the determination result of the color differences between the reference colors and sample colors (step S83).

Figure 29:
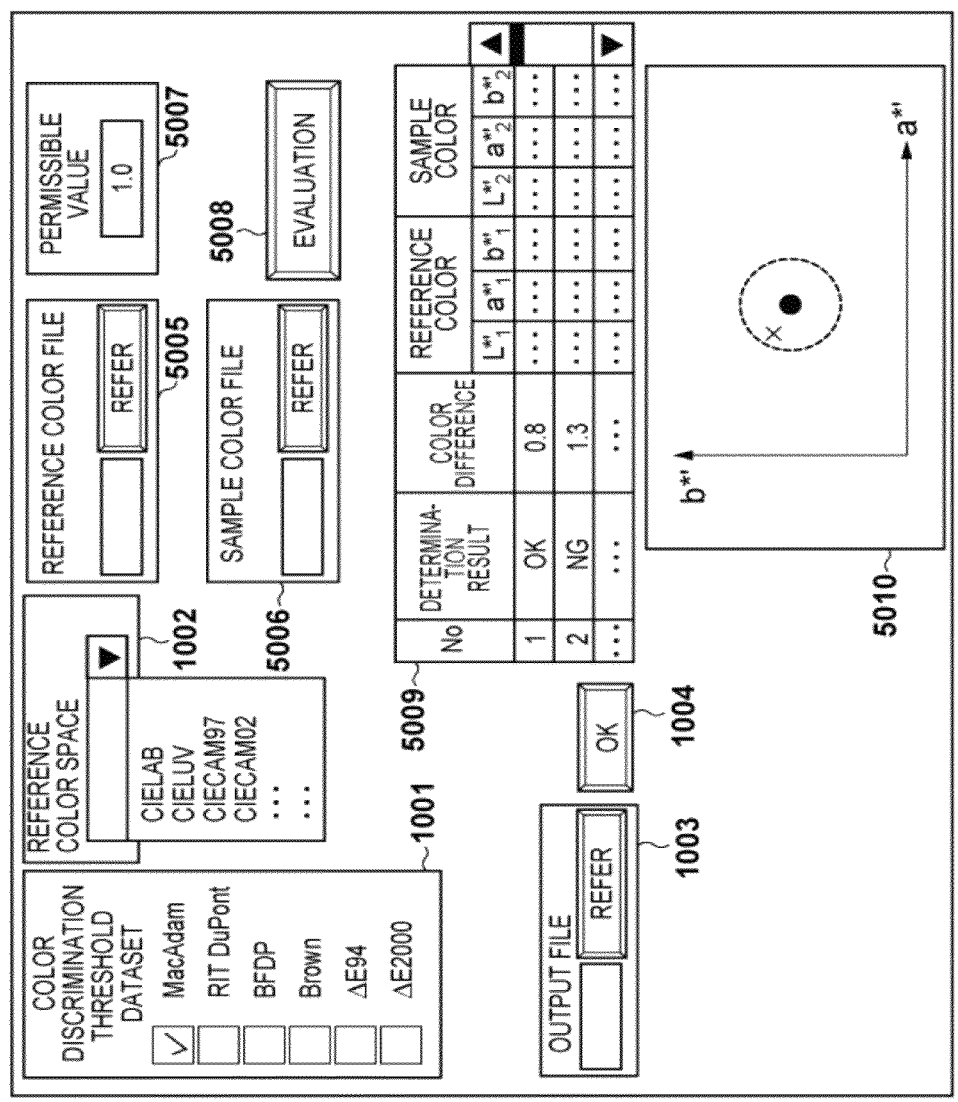
FIG. 29 is a view showing an example of a UI displayed by a UI display unit according to the fifth embodiment.

FIG. 29 shows an example of the UI displayed by the UI display unit 102 of the fifth embodiment. On the UI of the fifth embodiment, a reference color setting area 5005, sample color setting area 5006, permissible value setting area 5007, evaluation button 5008, determination result display area 5009, and color distribution display area 5010 are added to the UI of the first embodiment shown in FIG. 5.

The user can set reference colors and sample colors to be evaluated by operating the reference color setting area 5005 and sample color setting area 5006. Also, when the user sets an permissible value in the permissible value setting area 5007 and presses the evaluation button 5008, the determination result is displayed on the determination result display area 5009. Note that the fifth embodiment has exemplified the case in which the determination result is displayed on the UI, but the determination result may be output as a file.

When the user selects a certain row in the determination result display area 5009 using a mouse or the like, a color distribution of the reference color and sample color is displayed on the color distribution display area 5010. A black dot represents a reference color, a x mark represents a sample color, and a broken line circle represents a permissible value range.

Note that the color values of the reference color and sample color have to be expressed using the same color space as the reference color space used upon generation of the conversion parameters (or LUT). If one or both of these color values are expressed using a color space different from the reference color space, that color value need only be converted into the same color space as the reference color space.

Figure 30A:
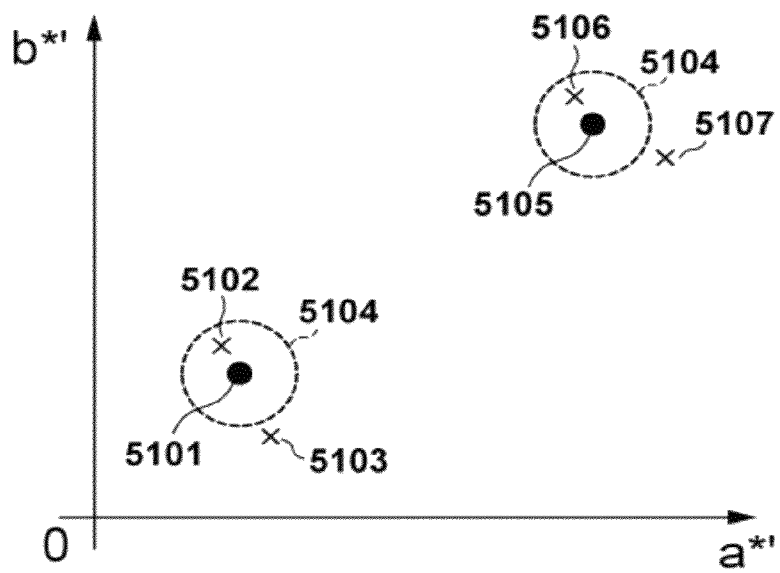
FIGS. 30A and 30B are graphs for explaining color difference evaluation on a uniform color appearance space.
Figure 30B:
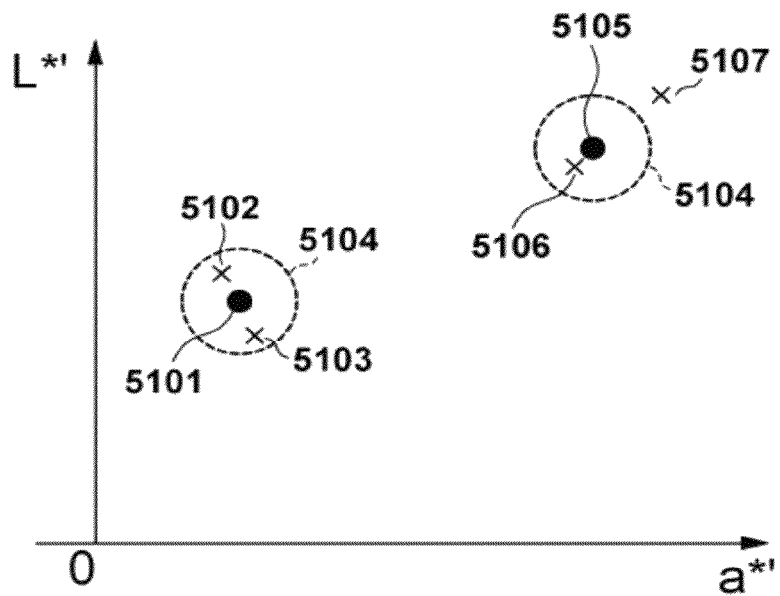

Color difference evaluation on the uniform color appearance space will be described below with reference to FIGS. 30A and 30B. In FIGS. 30A and 30B, each of black dots 5101 and 5105 represents a reference color, each of x marks 5102, 5103, 5106, and 5107 represents a sample color, and a broken line circle 5104 represents permissible value range. FIG. 30A shows color distributions of the reference colors and sample colors on an a*'b*' plane, and FIG. 30B shows those on an L*'a*' plane. Upon execution of color difference evaluation on a uniform color appearance space L*'a*'b*', evaluation is very easy.

On the uniform color appearance space, as shown in FIGS. 30A and 30B, evaluation can be made using the same permissible value even for a reference color 5101 in a low-saturation range and for a reference color 5105 in a high-saturation range. Also, a color difference need not be calculated by weighting in L*', a*', and b*' directions. By determining only whether or not a three-dimensional distance between the reference color and sample color is equal to or smaller than the permissible value, an evaluation result which matches perceptive evaluation can be obtained. Note that an evaluation value may be set according to evaluation criteria. For example, a permissible value=1.0 is set to determine whether or not a neighboring reference color and sample color have levels whose difference cannot almost be detected (that one cannot perceive), and a permissible value=3.0 is set to determine whether or not a reference color and sample color have levels which can be handled as the same colors on an impression level.

In this manner, colors can be evaluated using the uniform color appearance space which matches appearance, and an evaluation result which matches a result that one perceptively evaluates can be obtained by a very simple method.

Modification of Embodiments

In the above embodiments, several types of color spaces specified by the CIE have been exemplified as a reference color space used to generate a uniform color appearance space. However, the reference color space is not limited to those color spaces, and an AdobeRGB space, sRGB space, or YCbCr space may be used. Hence, arbitrary color spaces can be used as long as conversion methods from CIE tristimulus values XYZ are defined for these color spaces.

In the above embodiments, the case has been exemplified wherein the compression ratio to the center of each control point is set as a gamma coefficient. However, the compression ratio is not limited to a gamma coefficient. For example, a plurality of points may be given as a linear table, and the compression ratio may be controlled by that table. Furthermore, the number of centers is not limited to the above example, and an origin of a color space may be used.

In the above embodiments, the case has been exemplified wherein an LUT is used as the conversion parameters. However, a formula of a matrix or the like may be used as the conversion parameters. The matrix can be generated by approximating the correspondence relationship shown in FIG. 10. Alternatively, color space values after conversion may be directly calculated using the positions and compression ratios of the control points calculated by the optimization unit 106 as the conversion parameters. Of course, the LUT and direct calculations may be selectively used. That is, when the processing is to be speeded up, the LUT may be used; when importance is attached to precision, the direct calculations may be used.

In the above embodiments, the arrangement which selects color discrimination threshold data from several types of datasets which have already been proposed or datasets derived from a color difference formula is adopted. However, other existing datasets and datasets generated by executing unique color-matching tests or the like may be used as color discrimination threshold data.

In the above embodiments, the case has been exemplified wherein one color discrimination threshold dataset is selected from a plurality of datasets. However, the number of datasets to be selected is not limited to one, but a plurality of datasets may be selected. Also, datasets to be used may be changed depending on color areas, needless to say.

In the above embodiments, the uniform color appearance space is generated using the color discrimination threshold data. However, the present invention is not limited to the color discrimination threshold data, but it is applicable to an appearance uniformity dataset that one feels the same color differences. In this case, the equation used to calculate the evaluation value in the optimization unit 106 is changed to:

$$E=\Sigma[D-\sqrt{\{(L^*_c-L^*_i)^2+(a^*_c-a^*_i)^2+(b^*_c-b^*_i)^2\}}]/4 \quad (5)$$

where a $\Sigma$ calculation range is i=1 to 4, and
D is a value corresponding to the color difference.

Also, an evaluation value obtained by weighing a lightness or chromaticity value may be used, and for example, weights $m_L$, $m_a$, and $m_b$ may be set for respective terms like:

$$E=\Sigma[1-\sqrt{\{m_L(L^*_c-L^*_i)^2+m_a(a^*_c-a^*_i)^2+m_b(b^*_c-b^*_i)^2\}}]/4 \quad (6)$$

where a $\Sigma$ calculation range is i=1 to 4.

In the above embodiments, the case has been exemplified wherein the data acquisition unit 103 acquires color discrimination threshold data of CIE tristimulus values XYZ, and the control point setting unit 105 converts the color discrimination threshold data into values on the reference color space. However, the color discrimination threshold data of the reference color space may be prepared in advance, needless to say.

In the above embodiments, the case has been exemplified wherein the color discrimination threshold data is approximated to ellipse data, and evaluation is made using five points including the ellipse center. Alternatively, the color discrimination threshold data may be directly used in evaluation.

Upon execution of the evaluation using equations (3) and (4), for example, when distances between the ellipse center and respective end points become too small, weighting may be made to worsen an evaluation result. In this manner, generation of crash of a color space can be effectively prevented.

In the second embodiment, the case has been exemplified wherein the user designates the control region and control points using the UI shown in FIG. 16. However, for example, when a reference color space is three-dimensionally (3D) displayed on the UI, the user can arbitrary designate a control region, and can designate arbitrary control points at boundaries of the control region.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-135695, filed Jun. 17, 2011 and 2012-112687, filed May 16, 2012, which are hereby incorporated by reference herein in their entirety.

What is claimed is:

1. A color processing apparatus comprising:
    an input unit configured to input data which represents a color space;
    an acquisition unit configured to acquire a dataset which represents visual uniformity in each of a plurality of color areas, wherein the dataset comprises an elliptical curve;
    a setting unit configured to set, on the color space, a plurality of control points which indicate a control region;
    a generation unit configured to generate conversion parameters required to convert an arbitrary point on the color space into a point on a uniform color appearance space using the plurality of control points, the dataset, and a center of the color space, wherein the color space is a reference color space used as a reference upon generation of the uniform color appearance space, and the uniform color appearance space is a color space which is uniform with respect to human appearance; and
    a calculation unit configured to calculate control parameters which are required to make shapes of graphics that represent respective data of the dataset on the reference color space closer to perfect circles, and indicate positions of the plurality of control points after movement, wherein the calculation unit calculates, as the control parameters, a moving direction and a moving amount of each control point and a compression ratio of the control point to an achromatic point at a lightness level at which that control point is set, using an optimization method, and the generation unit generates the conversion parameters required to convert the arbitrary point on the reference color space into the point on the uniform color appearance space using the calculation result, and
    wherein at least one of the input unit, the acquisition unit, the setting unit, and the generation unit is implemented using a processor.

2. The apparatus according to claim 1, wherein the setting unit sets the control region, and the plurality of control points at boundaries of the control region on the reference color space.

3. The apparatus according to claim 1, wherein the compression ratio specifies a moving position of an intermediate point between the control point and the achromatic point.

4. The apparatus according to claim 1, wherein the acquisition unit acquires a color discrimination threshold dataset, which specifies a range discriminable by human, as the dataset which represents the visual uniformity.

5. The apparatus according to claim 1, wherein the setting unit sets the control region and the plurality of control points for a plurality of lightness levels on the reference color space.

6. The apparatus according to claim 1, further comprising:
    a conversion unit configured to convert a gamut of an input device and a gamut of an output device into the uniform color appearance space using the conversion parameters; and
    a mapping unit configured to generate a table used to map the gamut of the input device after conversion into the gamut of the output device after conversion.

7. The apparatus according to claim 1, further comprising:
    a converter configured to convert the data which represents the color space into data which represents the color space under another viewing environment; and
    a generator configured to generate conversion parameters required to convert an arbitrary point on the color space under the other viewing environment into a point on the uniform color appearance space based on a correspondence relationship between the data which represents the color space after conversion and conversion parameters used in the conversion.

8. The apparatus according to claim 1, wherein the uniform color appearance space is a color space which expresses visual uniform hue data within a predetermined hue difference.

9. The apparatus according to claim 8, wherein the predetermined hue difference is 3 degree.

10. The apparatus according to claim 8, wherein the visual uniform hue data is a color data group which is generated based on a subjective evaluation experiment and which is perceived as identical hues by human.

11. The apparatus according to claim 8, wherein the visual uniform hue data is uniform hue data at each hue of Munsell renovation data.

12. The apparatus according to claim 1, further comprising:
    a converter configured to convert a color value of a reference color and a color value of a sample color into color values on the uniform color appearance space using the conversion parameters; and
    an estimator configured to estimate a color difference by calculating a color difference between the color value of the reference color after conversion and the color value of the sample color after conversion, and comparing the color difference with a permissible value.

13. A color processing method comprising:
using a processor to perform the steps of:
inputting data which represents a color space;
acquiring a dataset which represents visual uniformity in each of a plurality of color areas, wherein the dataset comprises an elliptical curve;
setting, on the color space, a plurality of control points which indicate a control region;
generating conversion parameters required to convert an arbitrary point on the color space into a point on a uniform color appearance space using the plurality of control points, the dataset, and a center of the color space, wherein the color space is a reference color space used as a reference upon generation of the uniform color appearance space, and the uniform color appearance space is a color space which is uniform with respect to human appearance; and
calculating control parameters which are required to make shapes of graphics that represent respective data of the dataset on the reference color space closer to perfect circles, and indicate positions of the plurality of control points after movement,
wherein, in the calculating step, a moving direction and a moving amount of each control point and a compression ratio of the control point to an achromatic point at a lightness level at which that control point is set are calculated using an optimization method as the control parameters, and, in the generation step, the conversion parameters required to convert the arbitrary point on the reference color space into the point on the uniform color appearance space are generated using the calculation result.

14. A non-transitory computer readable medium storing a computer-executable program for causing a computer to perform a color processing method, the method comprising the steps of:
inputting data which represents a color space;
acquiring a dataset which represents visual uniformity in each of a plurality of color areas, wherein the dataset comprises an elliptical curve;
setting, on the color space, a plurality of control points which indicate a control region;
generating conversion parameters required to convert an arbitrary point on the color space into a point on a uniform color appearance space using the plurality of control points, the dataset, and a center of the color space, wherein the color space is a reference color space used as a reference upon generation of the uniform color appearance space, and the uniform color appearance space is a color space which is uniform with respect to human appearance; and
calculation control parameters which are required to make shapes of graphics that represent respective data of the dataset on the reference color space closer to perfect circles, and indicate positions of the plurality of control points after movement,
wherein, the calculating step, a moving direction and a moving amount of each control point and a compression ratio of the control point to an achromatic point at a lightness level at which that control point is set, are calculated using an optimization method as the control parameters, and, in the generation step, the conversion parameters required to convert the arbitrary point on the reference color space into the point on the uniform color appearance space using the calculation result.

* * * * *